United States Patent
Takada et al.

(10) Patent No.: US 6,749,290 B2
(45) Date of Patent: Jun. 15, 2004

(54) RECORDING UNIT, IMAGE RECORDING APPARATUS AND IMAGE RECORDING METHOD

(75) Inventors: Yoichi Takada, Kanagawa (JP); Nobuyuki Matsumoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/231,304

(22) Filed: Aug. 30, 2002

(65) Prior Publication Data
US 2003/0081091 A1 May 1, 2003

(30) Foreign Application Priority Data
Sep. 4, 2001 (JP) .......................... 2001-268107

(51) Int. Cl.[7] ............... B41J 2/05; B41J 2/01
(52) U.S. Cl. .............. 347/65; 347/54; 347/47; 347/61; 347/100
(58) Field of Search ............. 347/65, 45, 47, 347/54, 56, 61, 100, 96, 95, 101

(56) References Cited

U.S. PATENT DOCUMENTS

| 5,428,383 A | 6/1995 | Shields et al. |
| 5,599,386 A | 2/1997 | Sano et al. |
| 5,976,230 A | 11/1999 | Askeland et al. |
| 6,354,698 B1 | 3/2002 | Tachihara et al. |

FOREIGN PATENT DOCUMENTS

| DE | 195 05 465 | 8/1995 | | |
| EP | 0 569 156 | 11/1993 | | |
| EP | 0 775 580 | 5/1997 | | |
| EP | 0879857 A2 | * 11/1998 | ............ | B41J/2/01 |
| EP | 0 925 930 | 6/1999 | | |
| EP | 0952196 A1 | * 10/1999 | ............ | C09D/11/00 |
| EP | 0 953 445 | 11/1999 | | |
| EP | 0953445 A2 | * 11/1999 | ............ | B41J/2/05 |
| EP | 1 090 966 | 4/2001 | | |
| EP | 1 125 994 | 8/2001 | | |
| JP | 8-73791 | 3/1996 | | |
| JP | 11-188870 | 7/1999 | | |
| JP | 11-209673 | 8/1999 | | |

* cited by examiner

*Primary Examiner*—Stephen Meier
*Assistant Examiner*—Manish Shah
(74) *Attorney, Agent, or Firm*—Fitzpatrick, Cella, Harper & Scinto

(57) ABSTRACT

A recording unit and an image recording apparatus are of a configuration in which the black image and character formed by the black ink in the presence of the color ink satisfy various properties such as a high optical density, high image quality and high image fastness, and which also enables prevention of bleeding and white haze and saving of ink consumption. There is provided an ink jet head employing an ink set including black ink and color inks, in which the black ink contains a salt, an aqueous medium and a coloring material dispersed in the aqueous medium by the function of an ionic radical, and at least one of the color inks contains a polyvalent metal salt capable, when mixed with the black ink, of impairing the dispersion stability of the coloring material in the black ink. The ink jet head has a configuration, in a portion for discharging the polyvalent metal salt containing ink used as the color ink, utilizing a discharge method in which the bubble generated in the ink in the ink flow path is opened through to the discharge port at the ink discharge.

13 Claims, 15 Drawing Sheets

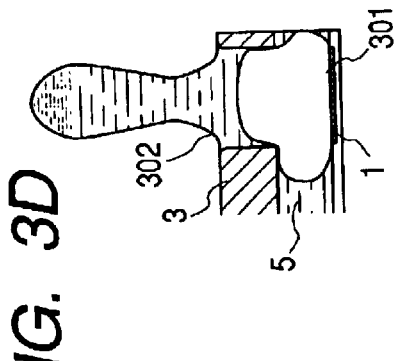
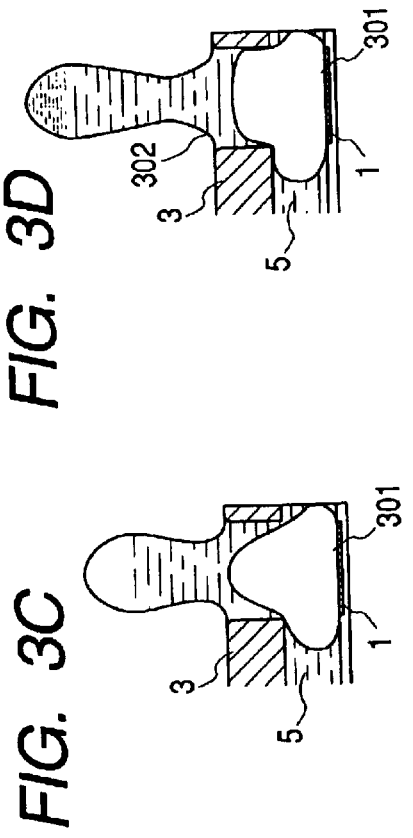
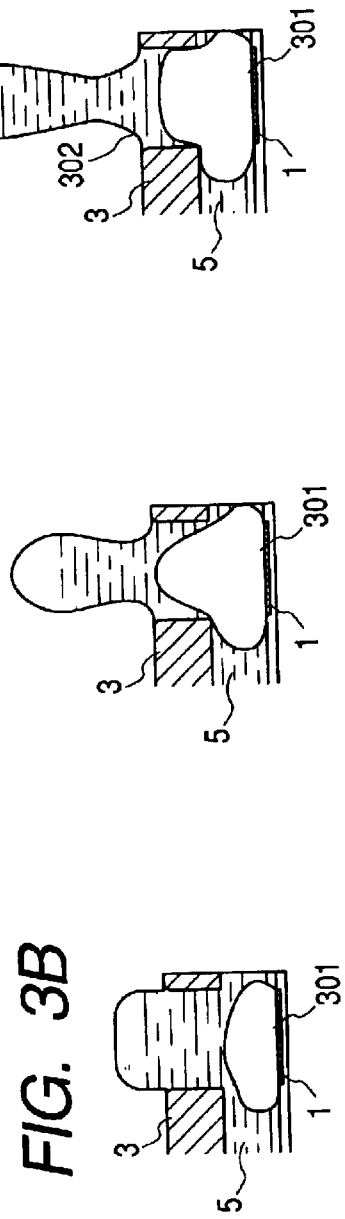
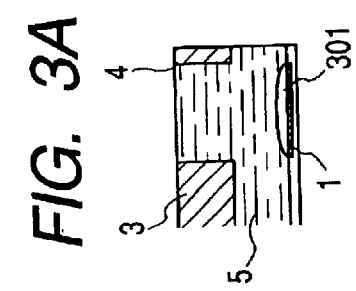
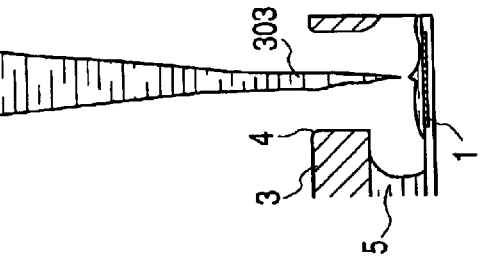
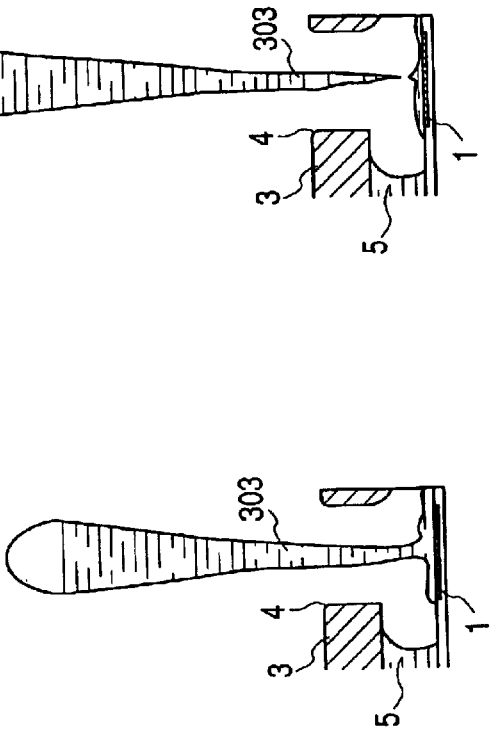
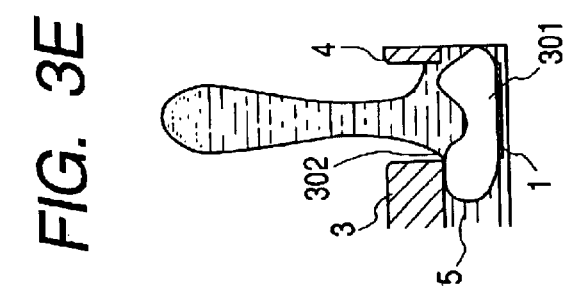

(1)  (2)  (3)

RECORDING UNIT, IMAGE RECORDING APPARATUS AND IMAGE RECORDING METHOD

BACKGROUND OF THE INVENTION

1. Field of the Invention

The present invention relates to a recording unit, an image recording apparatus and an image recording method.

2. Related Background Art

The ink jet recording method is a non-impact recording method of low noise, capable of recording an image by directly discharging ink onto a recording medium. This method, not requiring a complex apparatus in exploitation, is capable of easily achieving a low running cost, compactization of apparatus, color image recording etc.

For this reason, the ink jet recording method has been commercialized in various recording apparatus such as a printer, a copying apparatus, a facsimile apparatus and a word processor. Also such ink jet recording technology has been applied to a color ink jet recording apparatus for forming a multi-color image utilizing black ink and color ink (for example at least a color ink selected from yellow ink, cyan ink, magenta ink, red ink, green ink and blue ink).

On the other hand, the ink jet recording method is associated with a drawback of so-called bleeding phenomenon that, in case two different inks are deposited in adjacent manner on a recording medium, such inks are mutually mixed at the boundary to deteriorate the quality of the recorded image. In particular, the color mixing at the boundary of black ink and color ink has a strong influence in deteriorating the image quality, and various methods for resolving such drawback are therefore being developed.

A representative resolving method consists of an ink set and a recording method utilizing the same, which incorporates a mechanism, in case two inks are deposited in mutually adjacent manner onto a recording medium, of causing a viscosity increase in at least one of the two inks, or coagulation or precipitation of the coloring material of at least one of the two inks, thereby preventing the bleeding phenomenon.

For example, U.S. Pat. No. 5,428,383 discloses incorporating a precipitating agent (for example a polyvalent metal salt) in one of the inks and employing a coloring agent consisting of an organic dye having a carboxyl radical and/or a carboxylic acid salt radical in the other of the inks, preferably in the black ink. When these inks are printed in a mutually adjacent manner, the first ink containing the precipitating agent causes the coloring agent having the carboxyl radical and/or the carboxylic acid salt radical to precipitate, whereby the coloring agent is prevented from moving to the other ink, thereby reducing the bleeding phenomenon between the two adjacent print areas.

Also the U.S. Pat. No. 5,976,230 discloses a technology of depositing two mutually reacting inks in a same area thereby preventing the bleeding phenomenon.

There has been investigated the configuration of the ink jet head more advantageously using an ink set including the combination of such black ink and color ink. As a result, it is concluded that, in the case of employing a polyvalent metal salt as a component for providing reactivity between the two different inks, the configuration of a portion in the liquid flow path of the ink jet head coming into contact with the ink, particularly a portion above the heat-generating member (electrothermal converting element), for example the configuration of the protective layer, plays an important role in improving the discharge durability of the ink jet head. In such configuration, it is concluded that a discharge system, in which a bubble generated by the thermal energy provided by the heat generating member at the discharge of an ink droplet from a discharge port communicates with or is opened through to the external air, is effective for improving the discharge durability even in case of employing an ink containing a polyvalent metal salt.

The present invention has been attained on the abovementioned finding of the present inventors.

SUMMARY OF THE INVENTION

The object of the present invention is to provide a recording unit and an image recording apparatus capable, even in case of employing an ink containing a polyvalent metal salt, of improving the discharge durability while retaining the advantage of utilizing such polyvalent metal salt, and an image recording method utilizing such unit and apparatus.

According to the present invention, there is provided a recording unit comprising an ink container portion for containing an ink which contains a coloring material and an aqueous medium and an ink jet head portion for discharging a droplet of such ink;

wherein the ink is a polyvalent metal salt containing ink which further contains a polyvalent metal salt;

the aforementioned ink jet head portion for discharging the polyvalent metal salt containing ink includes a discharge port for discharging ink, a liquid flow path communicating with the discharge port and supplying the discharge port with the ink; and an electrothermal converting element provided on a bottom face opposed to the discharge port in the liquid flow path and serving to generate thermal energy to be utilized for ink discharge; and the ink jet head portion functions according to an ink discharge method including a discharge step of discharging an ink droplet from the discharge port utilizing the pressure of a bubble generated in the ink by providing of the thermal energy to the ink present in the flow path, and an ink replenishing step of replenishing ink in a portion for forming the aforementioned bubble after the bubble reaches an open state through to the external air via the discharge port along with the ink discharge from the discharge port.

According to the present invention, there is also provided an image recording apparatus comprising an ink jet head for discharging ink containing a coloring material and an aqueous medium;

wherein the ink is a polyvalent metal salt containing ink which further contains a polyvalent metal salt;

the ink jet head for discharging the polyvalent metal salt containing ink includes a discharge port for discharging the ink, a liquid flow path communicating with the discharge port and supplying the discharge port with the ink; and an electrothermal converting element provided on a bottom face opposed to the discharge port in the liquid flow path and serving to generate thermal energy to be utilized for ink discharge; and the ink jet head functions according to an ink discharge method including a discharge step of discharging an ink droplet from the discharge port utilizing the pressure of a bubble generated in the ink by providing the thermal energy to the ink present in the flow path, and an ink replenishing step of replenishing ink in a portion for forming the aforementioned bubble after the bubble reaches an opened state through to the external air via the discharge port along with the ink discharge from the discharge port.

According to the present invention, there is further provided an image recording method for forming an image by discharging ink containing a coloring material and an aqueous medium onto a recording medium;

wherein the ink is a polyvalent metal salt containing ink which further contains a polyvalent metal salt;

the ink jet head for discharging the polyvalent metal salt containing ink includes a discharge port for discharging the ink, a liquid flow path communicating with the discharge port and supplying the discharge port with the ink; and an electrothermal converting element provided on a bottom face opposed to the discharge port in the liquid flow path and serving to generate thermal energy to be utilized for ink discharge; and the ink discharge by the ink jet head includes a discharge step of discharging an ink droplet from the discharge port utilizing the pressure of a bubble generated in the ink by providing of the thermal energy to the ink present in the flow path, and an ink replenishing step of replenishing ink in a portion for forming the aforementioned bubble after the bubble reaches an opened state through to the external air via the discharge port along with the ink discharge from the discharge port.

The present invention adopts, in the ink jet head for discharging the ink containing the polyvalent metal salt, a discharge method in which the bubble generated in the liquid flow path is opened through to the external air via the discharge port, thereby enabling to improve the discharge durability of the ink jet head even in case of utilizing the polyvalent metal salt containing ink.

In an ink jet head of a discharge method in which the bubble is not opened through to the external air, durability is required against a cavitation phenomenon generated at the ink discharge, namely a physical impact resulting from the formation and vanishing of the bubble, in a protective layer provided at least in an ink-contacting portion of a heater surface of the electrothermal converting element. Such cavitation is considered to result from a process that the bubble generated and showing a volume increase in the ink by the heat from the heater assumes a negative internal pressure after the termination of heating by the heater, thereby vanishing after a rapid volume decrease. On the other hand, in the aforementioned discharge method in which the bubble is opened through to the external air, the aforementioned process of negative pressure generation does not take place because the bubble is opened through to the external air, so that the cavitation phenomenon is practically absent.

In case of employing the ink containing polyvalent metal salt in the discharge method in which the bubble is not opened through to the external air, the influence of cavitation, for example the proceeding of corrosion, may be enhanced under the presence of the polyvalent metal salt, and it is required to provide the heater portion with a protective layer of a configuration capable of withstanding such situation. On the other hand, in the ink jet head employing the ink containing the polyvalent metal salt, the use of the discharge method in which the bubble is opened through to the external air allows to relax the requirement on the durability on the protective layer provided on the heater surface. As a result, if the protective layer of a same configuration is applied to the ink jet heads for discharging the polyvalent metal salt containing ink respectively with the discharge method in which the bubble is opened through to the external air and with the discharge method in which the bubble is not opened through to the external air, the former head causes less breakage thereby becoming superior in the discharge durability.

BRIEF DESCRIPTION OF THE DRAWINGS

FIGS. 2A and 2B are views showing the principal part of the liquid discharge head shown in FIGS. 1A and 1B, wherein FIG. 2A is a lateral cross-sectional view in which a discharge port is seen from a lateral side thereof while FIG. 2B is a plan view of the discharge port shown in FIG. 2A;

FIGS. 3A, 3B, 3C, 3D, 3E, 3F, 3G and 3H are cross-sectional views showing the function of a liquid discharge head in an embodiment of the liquid discharge method of the present invention;

FIGS. 11A, 11B, 11C, 11D, 11E and 11F are views showing a mechanism of extremely effectively eliminating the unevenness in the reciprocating motion, wherein FIGS. 11A, 11B and 11C show an ink fixing process to a recording material in case black ink with low penetration into the recording material is deposited at first and easily penetrating color ink is deposited thereafter, while FIGS. 11D, 11E and 11F show an ink fixing process to the recording material in case the easily penetrating color ink is deposited at first and the low penetrating black ink is deposited thereafter;

DESCRIPTION OF THE PREFERRED EMBODIMENTS

Figure 1A:
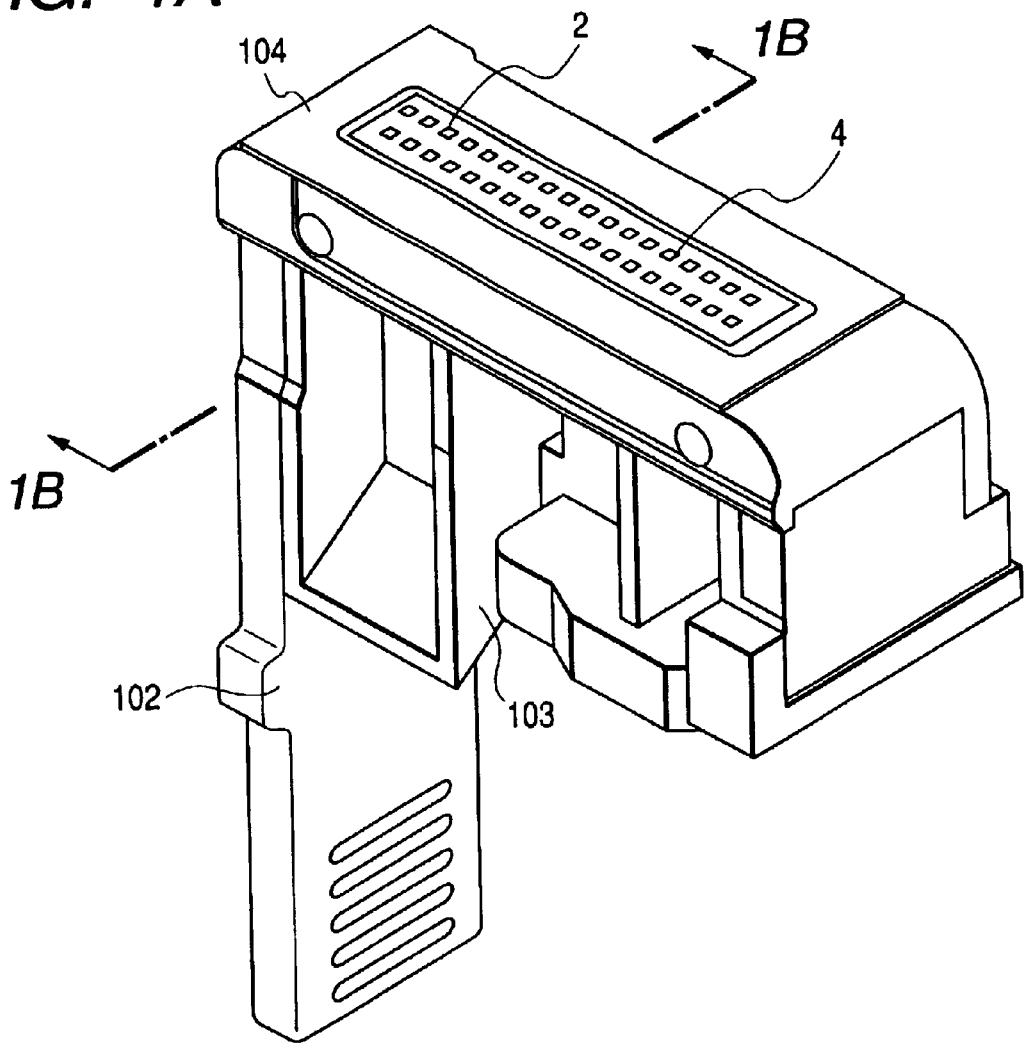
FIGS. 1A and 1B are respectively an external perspective view and a cross-sectional view along a line 1B—1B in FIG. 1A, showing the schematic configuration of a liquid discharge head in which the liquid discharge method of the present invention is applicable.

In the following there will be given a detailed explanation on the black ink and the color ink constituting the ink set of the present invention.

In the following, the present invention will be clarified in detail, as an example, by a case where the compositions of the color ink and the black ink are so adjusted that the dispersion stability of the coloring material in such black ink is impaired when the color ink and the black ink are mixed.

The impairing of the dispersion stability of the coloring material contained in the black ink in such ink combination indicates, for example, coagulation of such coloring material, precipitation thereof or a viscosity increase in such black ink. The viscosity increase means a phenomenon that the viscosity of the ink after mixing becomes higher than the viscosity of the black ink or the color ink prior to mixing. In the following there will be explained the configurations of the present invention.

(Reactivity of Black Ink and Color Ink)

The compositions of the black ink and the color ink of the present invention are preferably prepared in such a manner that the dispersion stability of the coloring material in the black ink is impaired as explained in the foregoing when the black ink and the color ink are mixed. For example, there can be conceived a configuration in which the color ink contains a polyvalent metal salt as an additive for impairing the dispersion stability of the pigment in the black ink when such the color ink is mixed with the black ink. As a specific example of the combination of such black ink and color ink, there can be employed a combination in which the coloring material in the black ink has an anionic radical while the color ink contains a polyvalent metal salt including polyvalent metal cations such as at least a divalent metal salt including polyvalent metal cations selected from $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$, and $Al^{3+}$. Such polyvalent metal salt can be employed in at least one kind, in such a manner that at least one of the aforementioned divalent metal cations is supplied in the ink.

In the above-described example, when the color ink is mixed with the black ink, the polyvalent metal cations of the polyvalent metal salt in the color ink react with the anionic radicals of the coloring material in the black ink, whereby the dispersion of the coloring material in the black ink is destructed to induce coagulation of the coloring material or a viscosity increase of the ink. The polyvalent metal salt in the color ink is preferably contained, for example, in an amount of about 0.1 to 15 mass % with respect to the total mass of the color ink.

(Black Ink)

As the coloring material in the black ink, for example, carbon black can be employed advantageously. The carbon black may be dispersed in the ink by self dispersion or by dispersion with a dispersant.

(Self Dispersion Type Carbon Black)

Carbon black of self dispersion type can be carbon black in which at least a hydrophilic radical (anionic radical or cationic radical) is bonded as an ionic radical to the surface of the carbon black either directly or via another atom group. The use of such carbon black allows to reduce or dispense with the addition of a dispersant for carbon black dispersion.

In case of carbon black having an anionic radical bonded to the surface either directly or via another atomic group, the hydrophilic radical bonded to the surface can be, for example, —COO(M2), —SO₃(M2), —PO₃H(M2) or —PO₃(M2)₂, wherein "M2" stands for a hydrogen atom, alkali metal, ammonium or organic ammonium. Among these, the carbon black of self dispersion type, anionically charged by bonding of —COO(M2) or —SO₃(M2) to the carbon black surface, can be particularly advantageously employed in the present embodiment because of satisfactory dispersibility in the ink.

For "M2" in the aforementioned hydrophilic radicals, examples of the alkali metal include Li, Na, K, Rb and Cs; and those of the organic ammonium include methyl ammonium, dimethyl ammonium, trimethyl ammonium, ethyl ammonium, diethyl ammonium, triethyl ammonium, methanol ammonium, dimethanol ammonium and trimethanol ammonium.

The ink of the present embodiment containing self dispersion type carbon black in which M2 consists of ammonium or organic ammonium is capable of further improving the water resistance of the recorded image and can be advantageously employed in this respect. This effect is considered to be caused by the influence of deposition of ammonium and evaporation of ammonia when such ink is deposited onto the recording medium. The self dispersion type carbon black in which M2 consists of ammonium can be prepared, for example, by a method by processing carbon black of self dispersion type in which M2 is an alkali metal with an ion exchange method to replace M2 with ammonium, or a method of adding an acid to obtain H type and then adding ammonium hydroxide to introduce ammonium as M2.

The anionically charged carbon black of self dispersion type can be prepared, for example, by oxidizing carbon black with sodium hypochlorite, thereby chemically bonding —COONa to the surface of carbon black.

In case of cationically charged carbon black, the hydrophilic radical bonded either directly or via another atomic group can be, for example, at least one selected from quaternary ammonium radicals represented by the following formulas:

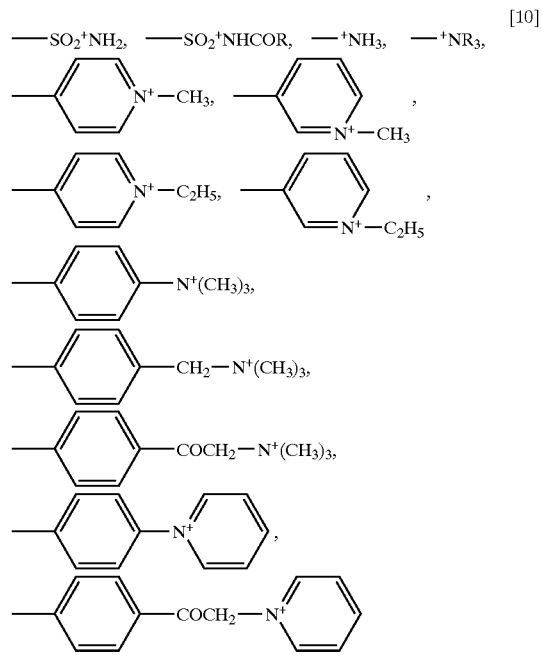

[10]

wherein R stands for a linear or ramified alkyl radical with 1 to 12 carbon atoms, an eventually substituted phenyl radical or an eventually substituted naphthyl radical.

The aforementioned cationic radical is associated, as a counter ion, for example with $NO_3^-$ or $CH_3COO^-$.

The self dispersion type carbon black cationically charged by the bonding of the aforementioned hydrophilic radical can be prepared as explained in the following, for example in case of bonding an N-ethylpyridyl radical of the following structure:

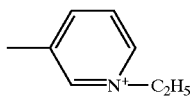

by a method of processing carbon black with 3-amino-N-ethylpyridinium bromide. The carbon black charged anionically or cationically by the production of the hydrophilic radical to the carbon black surface exhibits excellent dispersibility in water by the ionic repulsion, and maintains a stable dispersion state in the aqueous ink, even without the addition of a dispersant.

The aforementioned various hydrophilic radicals may be bonded directly to the surface of carbon black, or indirectly thereto by the presence of another atomic group between the carbon black surface and such hydrophilic radical. Examples of such another atomic group include a linear or ramified alkylene radical with 1 to 12 carbon atoms, a substituted or unsubstituted phenylene radical, and a substituted or unsubstituted naphthylene radical. The substituent on such phenylene radical or naphthylene radical can be, for example, a linear or ramified alkyl radical with 1 to 6 carbon atoms. Also examples of the combination of another atomic group and the hydrophilic radical include —$C_2H_4COO(M2)$, —Ph—$SO_3(M2)$ and —Ph—COO(M2), wherein —Ph— indicates a phenylene radical and M2 indicates the aforementioned radical.

In the present embodiment, two or more of the self dispersion type carbon black mentioned above may be employed as the coloring materials of the suitably selected color inks. Also the self dispersion type carbon black in the ink is preferably within a range of 0.1 to 15 mass %, particularly 1 to 10 mass % with respect to the total mass of the ink. Within such range, the self dispersion type carbon black can maintain a satisfactory dispersion state in the ink. Also for example for the adjustment of color of the ink, a dye may be added as a coloring material in addition to the self dispersion type carbon black.

(Ordinary Carbon Black)

As the coloring material for the black ink, there may also be employed ordinary carbon black of non-self dispersion type.

Examples of such carbon black include carbon black pigments, for example, furnace black, lamp black, acetylene black or channel black, such as Raven 7000, Raven 5750, Raven 5250, Raven 5000 ULTRA, Raven 3500, Raven 2000, Raven 1500, Raven 1250, Raven 1200, Raven 1190 ULTRA-11, Raven 1170 and Raven 1255 (the foregoing being supplied by Columbia Inc.), Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400 and Valcan XC-72R (foregoing being supplied by Cabot Inc.), Color Black FW1, Color Black FW2, Color Black FW2V, Color Black FW18, Color Black FW200, Color Black S150, Color Black S160, Color Black S170, Printex 35, Printex U, Pintex V. Printex 140U, Printex 140V, Special Black 6, Special Black 5, Special Black 4A and Special Black 4 (foregoing being supplied by Degussa Inc.), No. 25, No. 33, No. 40, No. 47, No. 52, No. 900, No. 2300, MCF-88, MA600, MA7, MA8 and MA100 (foregoing being supplied by Mitsubishi Chemical Co.), but these are non-restrictive examples and there may be employed conventionally known carbon black.

Also fine magnetic particles such as of magnetite or ferrite, or titanium black may be employed as black pigment.

In case of employing such ordinary carbon black as the coloring material of the black ink, a dispersant is preferably added therein in order to obtain stable dispersion in the aqueous medium.

There can be advantageously employed, for example, a dispersant having an ionic radical and capable of dispersing, by the function thereof, carbon black stably in the aqueous medium, and examples of such dispersant include styrene-acrylic acid copolymer, styrene-acrylic acid-alkyl acrylate copolymer, styrene-maleic acid copolymer, styrene-maleic acid-alkyl acrylate copolymer, styrene-methacrylic acid copolymer, styrene-methacrylic acid-alkyl methacrylate copolymer, styrene-maleic acid half ester copolymer, vinylnaphthalene-acrylic acid copolymer, vinylnaphthalene-maleic acid copolymer, styrene-maleic anhydride-maleic acid half ester copolymer, and salts thereof. Among these, there is preferred a dispersant having a mass-averaged molecular weight within a range of 1,000 to 30,000, more preferably within a range of 3,000 to 15,000.

(Salt Contained in Black Ink)

In case carbon black of self dispersion type is employed as the pigment for the black ink, a salt is preferably contained in the black ink.

The salt contained in the black ink of the present invention is preferably at least one selected from $(M1)_2SO_4$, $CH_3COO(M1)$, Ph—COO(M1), $(M1)NO_3$, (M1)Cl, (M1)Br, (M1)I, $(M1)_2SO_3$ and $(M1)_2CO_3$, wherein M1 stands for alkali metal, ammonium or organic ammonium, and Ph stands for a phenyl radical.

Examples of such alkali metal include Li, Na, K, Rb and Cs, and examples of organic ammonium include methyl ammonium, dimethyl ammonium, trimethyl ammonium, ethyl ammonium, diethyl ammonium, triethyl ammonium, methanol ammonium, dimethanol ammonium, trimethanol ammonium, ethanol ammonium, diethanol ammonium and triethanol ammonium.

Among these salts, sulfate salts (for example potassium sulfate) and benzotate salts (for example ammonium benzoate) show satisfactory compatibility with the self dispersion type carbon black, and allow to form ink jet recorded images of particularly excellent quality on various recording media, presumably because of an excellent solid-liquid separating effect upon deposition onto the recording medium.

The co-existence of the aforementioned salt in the ink containing a coloring material dispersed by the function of an ionic radical in the aqueous medium, for example ink containing self dispersion type carbon black allows to obtain an ink which does not change the image quality significantly depending on the kind of the recording medium and is capable of forming an image of high quality in stable manner.

The detailed mechanism with which the black ink of the present invention exhibits the aforementioned properties is not yet clear at present. However the present inventors have found that the Ka value, obtained by the Bristow method and known to indicate the penetrability of the ink into the recording medium, is larger in the black ink of the present invention than in an ink of an identical composition except for the absence of the salt addition.

An increase in the Ka value indicates an increase in the penetrability of the ink into the recording medium, and, according to the conventional knowledge of those skilled in the art, an increase in the ink penetrability means a decrease in the optical density. Stated differently, it has been commonly considered by those skilled in the art that the ink penetration also induces the penetration of the coloring material into the interior of the recording medium, thereby leading to a loss in the optical density.

Based on the comprehensive judgment of various observations obtained on the black ink of the present invention, the salt present in such black ink is considered to perform a specific function of inducing an extremely fast separation of the solvent and the solid content (solid-liquid separation) in the ink after deposition on paper. If the solid-liquid separation is slow upon ink deposition onto the recording medium, in case of an ink with a high Ka value or a paper with a high ink penetrability, the ink diffuses together with the coloring material isotropically into the paper, whereby it is anticipated that the sharpness of characters (character quality) is deteriorated and that the optical density is also lowered because of the penetration of the coloring material into the deep portion of the paper.

However, since such phenomena are not observed in the black ink of the present invention, it is presumed that the solid-liquid separation takes place promptly when the ink is deposited onto the recording medium and that a high-quality image is obtained despite an increase in the Ka value of the ink. Also the fact that the black ink of the present invention does not easily cause the deterioration of the character quality or the loss in the optical density even on paper of relatively high penetrability is presumably based on the same reason.

The amount of the coloring material, for example the self dispersion type carbon black, in the black ink of the present invention is preferably within a range of 0.1 to 15 mass %, particularly 1 to 10 mass %, with respect to the total mass of the ink. Also the salt content is preferably within a range of 0.05 to 10 mass %, particularly 0.1 to 5 mass %, with respect to the total mass of the ink. A more excellent effect can be enjoyed by maintaining the contents of the coloring material and the salt in the black ink within the aforementioned ranges.

In case of employing the aforementioned self dispersion type carbon black as the coloring material, and employing for example —COO(M2), —SO$_3$(M2)$_2$, —PO$_3$H(M2) or —PO$_3$(M2)$_2$ as the hydrophilic radical on the carbon black surface, ammonium or organic ammonium can be advantageously employed as M2 as explained in the foregoing, and, in one of the preferred embodiments, the salt contained in the black ink is made same as "M2", namely "M1"="M2".

More specifically, in the course of investigation on the effect of salt addition to the ink containing self-dispersion type carbon black, the present inventors have found that the ink stability is particularly improved when M2 (counter ion) of the hydrophilic radical of the self dispersion type carbon black is made same as M1. The reason for such effect obtained by matching M1 and M2 is not yet clear, but is presumably ascribable to a fact that salt exchange does not take place in the ink between the counter ion of the hydrophilic radical of the self dispersion type carbon black and the salt, whereby the dispersion of the self dispersion type carbon black can be maintained in stable manner.

Also in case both M1 and M2 are composed of ammonium or organic ammonium, there can be achieved a further increase in the water resistance of the recorded image, in addition to the stabilizing effect on the ink properties. In such case, if the salt in the ink is composed of Ph-COO (NH$_4$) (ammonium benzoate, Ph indicating a phenyl radical), there can be obtained an extremely excellent result on the ink re-dischargeability from the head nozzle after a pause in the ink jet recording.

Further, the use of such ink set provides an effect that the difference in the image density between an image formed solely with the black ink and an image formed by superposing the black ink and the color ink for reducing the bleeding phenomenon can be reduced to a level scarcely recognizable visually.

In the following there will be explained the reason of such effects.

(Image Formed with Black Ink and Color Ink)

In the following there will be explained the reason why the image of a high density is obtained by superposing the pigment-based black ink and the color ink containing the additive which impairs the dispersion stability of the pigment in such black ink, for the purpose of relaxing bleeding phenomenon and white haze.

In case of executing the process for bleeding prevention with the black ink and the color ink, the inks can be deposited in the following two methods with different orders of ink deposition.

Figure 11A:
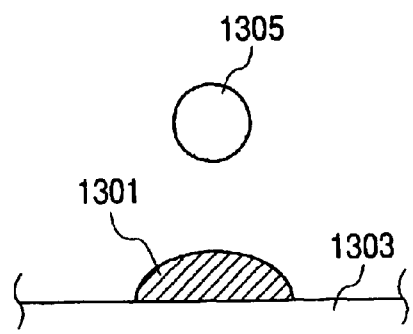
Figure 11B:
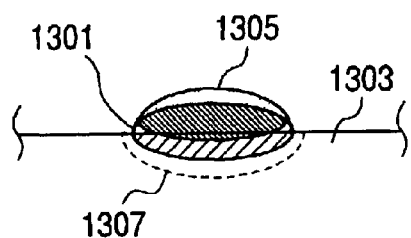
Figure 11C:
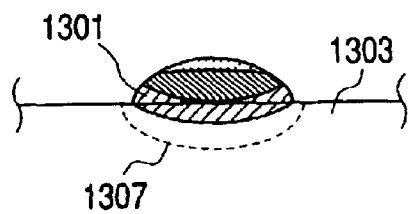
Figure 11D:
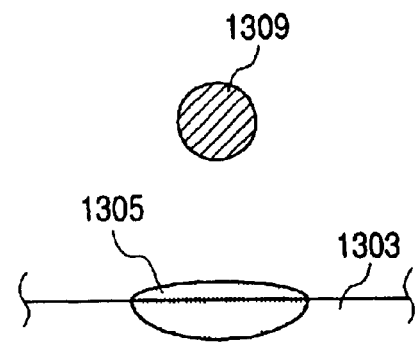
Figure 11E:
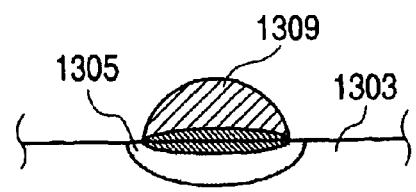
Figure 11F:
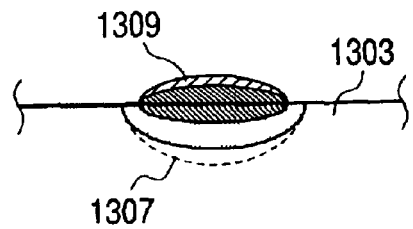

At first, in case of a method of depositing the color ink at first and the black ink later, the phenomena taking place on the recording medium are shown in FIGS. 11D to 11F, which show the states when the black ink containing a salt and the color ink reactive with the black ink are deposited in a same location.

As the black ink 1301 is deposited on the surface of the recording medium 1303 of which penetrability is increased by the color ink 1305, the penetration of the black ink 1301 into the recording medium is accelerated. However, because of the effect of the salt contained in the black ink 1301, the solid-liquid separation in the black ink on the surface of the recording medium takes place faster than the penetration of the coloring material of the black ink into the interior of the recording medium, whereby the separation and solidification of the coloring material are achieved promptly. Besides, the pigment in the black ink 1301 contacts the color ink 1305 on the surface of the recording medium 1303 to cause impairing of the dispersion state in the aqueous medium and resulting coagulation, whereby a coagulated substance 1309 is precipitated on the surface of the recording medium to suppress the penetration of the coloring material in the ink, as shown in FIG. 11F.

The component for impairing the dispersion stability of the pigment is a polyvalent metal salt contained as the additive, such as a divalent metal salt. The dye in the color ink is considered to penetrate into the interior of the recording medium and have a limited contribution to the increase of the image density, but the divalent metal salt is considered to have a molecular weight generally smaller than that of the dye, thereby achieving a higher reaction efficiency when the black ink and the color ink come into mutual contact and generating a larger amount of coagulated substance which remains in the vicinity of the surface of the recording medium. Also the pigment not involved in the reaction is considered to ride on the coagulated substance 1309, thereby contributing to the increase in the image density.

Therefore, the content of the coloring material on the surface of the recording medium and within a depth range of 15 to 30 μm from such surface, considered to determine the image density, becomes very high, thereby achieving a high image density.

In the following there will be explained, with reference to FIGS. 11A to 11C, a case where the color ink is deposited after the deposition of the black ink. When the black ink of lower penetrability covers the recording medium as shown in FIG. 11A, the black ink 1301 penetrates slowly into the recording medium 1303 because of its low penetrability. Then, when the color ink 1305 of higher penetrability is deposited thereafter, the penetration does not change much because the surface of the recording medium is covered by the black ink 1301.

In such situation, because the black ink 1301 and the color ink 1305 show slow penetration into the recording medium 1303, the coloring material of the black ink 1301 tends to remain on the surface of the recording medium, thereby showing a high optical density. Also the black ink and the color ink mutually react to leave a large amount of the coagulated substance 1309 of the pigment contained in the black ink. Thus, there can be obtained a print of a high optical density. Even in case the deposition amount of the color ink is large, the prompt solid-liquid separation and coagulation of the black ink leave a sufficient amount of solid on the paper surface, with satisfactory feeling of uniformity.

As explained in the foregoing, in case the color ink is deposited after the black ink, the dye in the color ink rides on the coagulated substance 1309. However, since the concentration of the coloring material in the ink jet ink is not so high, for example if the dye concentration in the color ink is less than 10% of the weight thereof, its contribution to the image density is considered almost zero at least in visual observation. On the other hand, the coagulated substance 1309 drastically increases the amount of the coloring material on the surface of the recording medium and within the depth range of 15 to 30 $\mu$m from the surface thereof, to provide an image of a high density.

In the present ink set, regardless of the order of deposition of the black ink and the color ink, the images obtained by the aforementioned two methods provide high image densities which are almost equal at least visually. Also since the coloring material in the ink is fixed as a coagulated substance in the upper portion of the recording medium, it is possible to suppress the penetration of the color ink of higher penetrability into the interior of the recording medium even if the black ink and the color ink are superposed on the recording medium.

As a result, it is rendered possible to effectively relax the bleeding phenomenon or the white haze. Also in case of forming an image with monotone gradation, a superior gradational representation can be easily realized without considering the order of deposition of the inks.

(Image Formed by Black Ink Only)

In the following there will be explained the mechanism in which the black ink of the present invention provides an image of a density substantially comparable in visual observation to that of the image obtained by superposing the black ink and the color ink as explained in the foregoing.

Figure 12A:
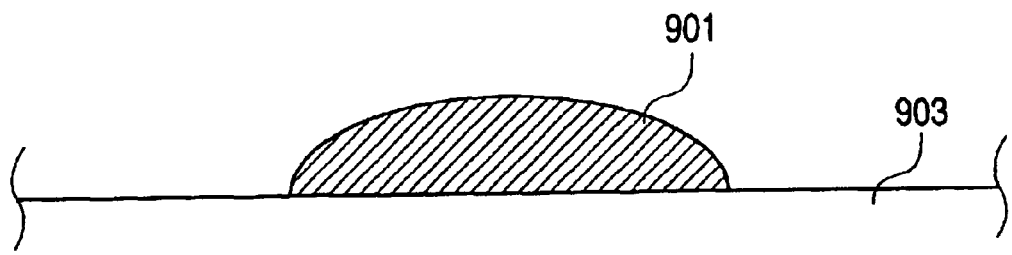
FIGS. 12A, 12B and 12C are schematic views showing a solid-liquid separation process in case pigment ink containing a salt is deposited on a recording medium.
Figure 12B:
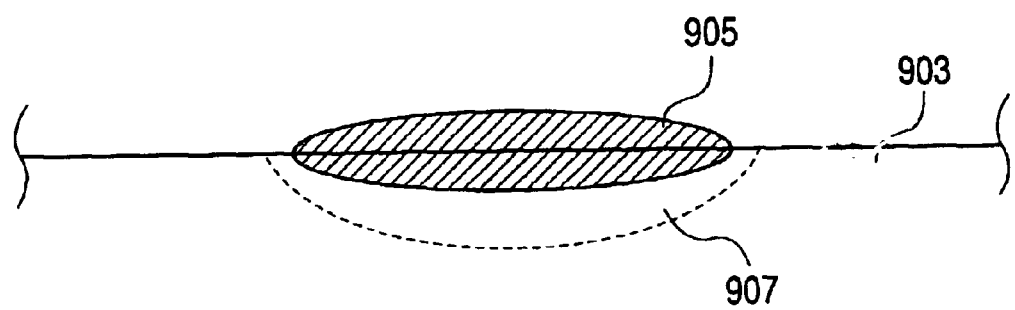
Figure 12C:
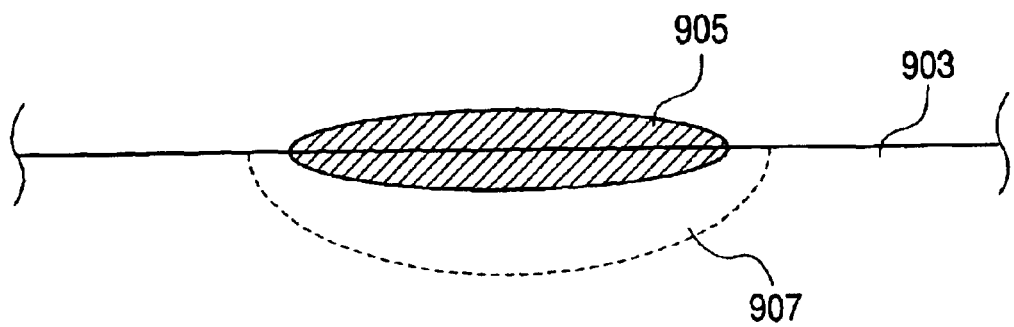
Figure 13A:
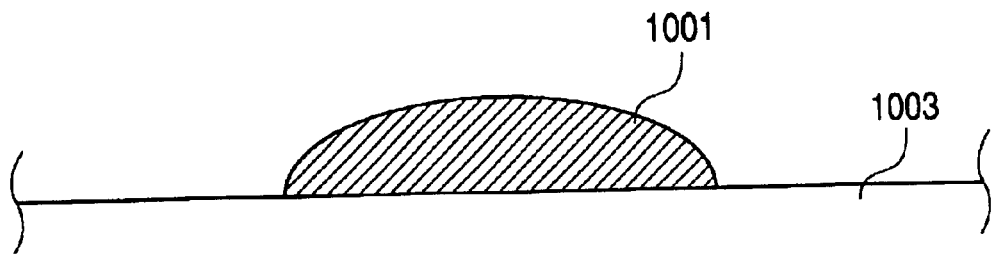
FIGS. 13A, 13B and 13C are schematic views showing a solid-liquid separation process in case pigment ink not containing a salt is deposited on a recording medium.

FIGS. 12A to 12C and FIGS. 13A to 13C are schematic views conceptually showing the states of solid-liquid separation, respectively in case of the salt-containing ink of the present invention and a reference salt-free ink are discharged from an orifice in the ink jet recording method onto a recording medium of relatively high penetrability such as ordinary paper. Immediately after the landing of the ink, the pigment ink 901 or 1001 rides on the surface of the paper 903 or 1003, regardless of the presence or absence of addition of the salt, as shown in FIGS. 12A and 13A.

Figure 13B:
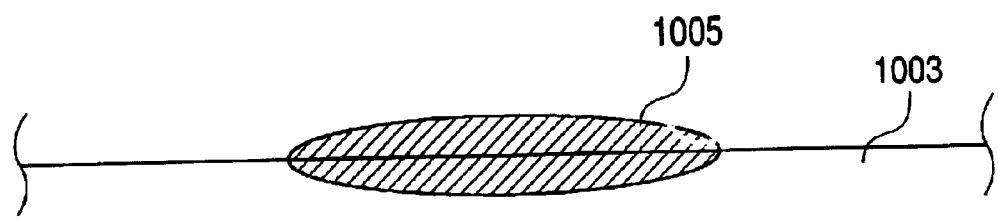

After the lapse of a time T1, the salt-containing pigment ink causes rapid solid-liquid separation as shown in FIG. 12B, thereby being separated into an area 905 containing most of the solid component of the ink and the solvent in the ink, and the front end 907 of penetration of the separated solvent proceeds to the interior of the paper 903. On the other hand, in the salt-free pigment ink, the solid-liquid separation does not take place as promptly as in the salt-containing ink, it penetrates into the interior of the paper 1003 in a state 1005 without solid-liquid separation, as shown in FIG. 13B.

Figure 13C:
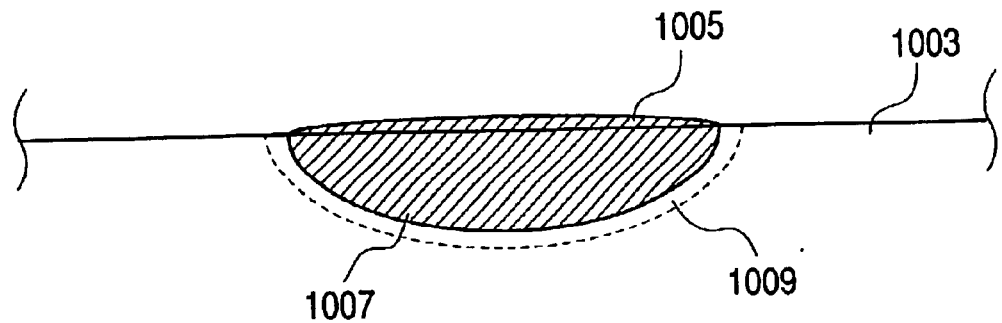

After the lapse of a time T2, in the salt-containing pigment ink, the front end 907 of penetration of the solvent further proceeds to the interior of the paper, but the area 905 remains on the paper surface and the vicinity thereof, as shown in FIG. 12C. On the other hand, in the salt-free pigment ink, the solid-liquid separation starts to take place at this point to generate a difference between the front end 1009 of penetration of the solid component of the ink and the front end 1007 of penetration of the solvent as shown in FIG. 13C, but the solid-containing area 1005 of the ink already reaches a deep portion of the recording medium.

The times T1 and T2 in the foregoing description are given as references for conceptually understanding the difference in the solid-liquid separation resulting from the presence or absence of salt.

As will be apparent from the foregoing, the salt addition induces prompt solid-liquid separation, whereby the solution penetrates into the interior of the recording medium with solid-liquid separation in a relatively early stage after the landing of the ink, and the coloring material (pigment) tends to remain in the upper portion of the recording medium thereby elevating the optical density. Also, the black ink is generally given a higher surface tension in comparison with the color ink as explained in the foregoing, and, in a state without the superposing with the color ink which increases the penetrability of the black ink into the recording medium, the black ink of the present invention causes prompt solid-liquid separation on the recording medium thereby significantly increasing the content of pigment on the surface of the recording medium and in the depth range of 15 to 30 $\mu$m from the surface thereof, which substantially defines the image density. As a result, the image formed with such black ink alone shows a significant increase in the image density.

Figure 14:
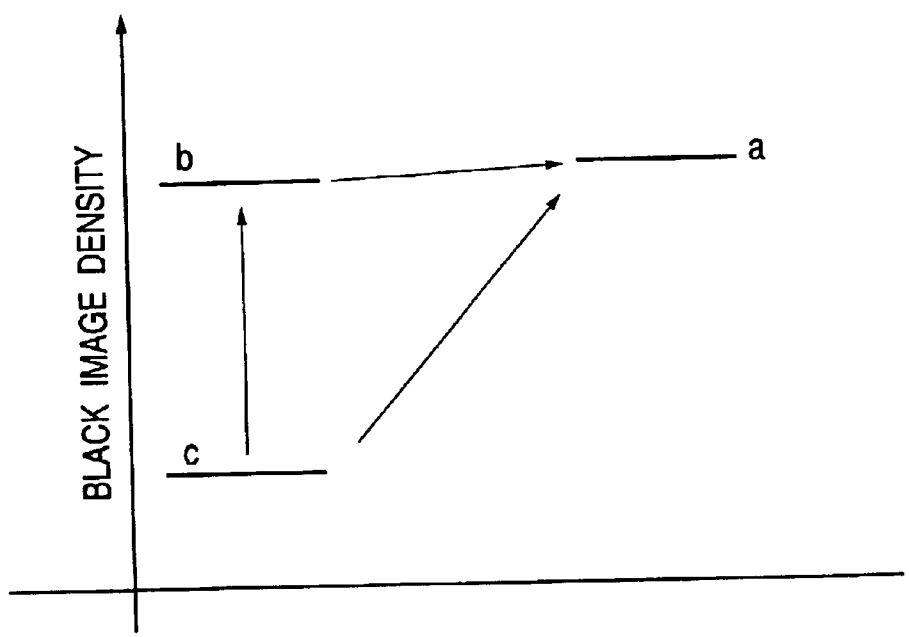
FIG. 14 is a chart showing the relationship of optical densities of the states shown in FIGS. 11C, 12C and 13C.

FIG. 14 shows the relaxing effect on the density difference, obtained by using the ink set of the present invention, wherein a indicates the image density obtained by superposing the black ink and the color ink, b indicates the image density obtained with the salt-containing black ink alone, and c indicates the image density obtained with the salt-free reference black ink alone. As will be apparent from this chart, the ink set of the present invention significantly relaxes the difference between the image densities a and c of the black ink, to a level where the difference between the image densities a and b is scarcely recognizable in the visual observation.

(Aqueous Medium of Black Ink)

The aqueous medium to be employed in the black ink of the present invention can be, for example, water or a mixture of water and water-soluble organic solvent. There is particularly preferred a water-soluble organic solvent having an effect of preventing the ink drying.

Specific examples include alkylalcohols with 1 to 4 carbon atoms such as methyl alcohol, ethyl alcohol, n-propyl alcohol, isopropyl alcohol, n-butyl alcohol, sec-butyl alcohol or tert-butyl alcohol; amides such as dimethylformamide or dimethylacetamide; ketones or ketoalcohols such as acetone or diacetone alcohol; ethers such as tetrahydrofurane or dioxane; polyalkylene glycols such as polyethylene glycol or polypropylene glycol; alkylene glycols with 2 to 6 carbon atoms in the alkylene radical such as ethylene glycol, propylene glycol, butylene glycol, triethylene glycol, 1,2,6-hexanetriol, thiodiglycol, hexylene glycol or diethylene glycol; lower alkylether acetates such as polyethylene glycol monomethylether acetate; glycerin; lower alkylethers of polyvalent alcohols such as ethylene glycol monomethyl (or ethyl) ether, diethylene glycol monomethyl (or ethyl) ether, or triethylene glycol monomethyl (or ethyl) ether;

polyvalent alcohols such as trimethylol propane or trimethylol ethane; N-methyl-2-pyrrolidone, 2-pyrrolidone and 1,3-dimethyl-2-imidazolidinone. The above-mentioned water-soluble organic solvents can be used singly or as a mixture. Water is preferably deionized water.

The content of the water-soluble organic solvent in the black ink of the present invention is not particularly restricted, but is preferably within a range of 3 to 50 mass % with respect to the total mass of the ink. Also the content of the water in the black ink is preferably within a range of 50 to 95 mass % with respect to the total mass of the ink.

The black ink explained in the foregoing provides an excellent effect of extremely reducing the dependence of the print quality on the recording medium. Besides, the advantages of the black ink of the present invention are not limited to such feature.

Figure 15:
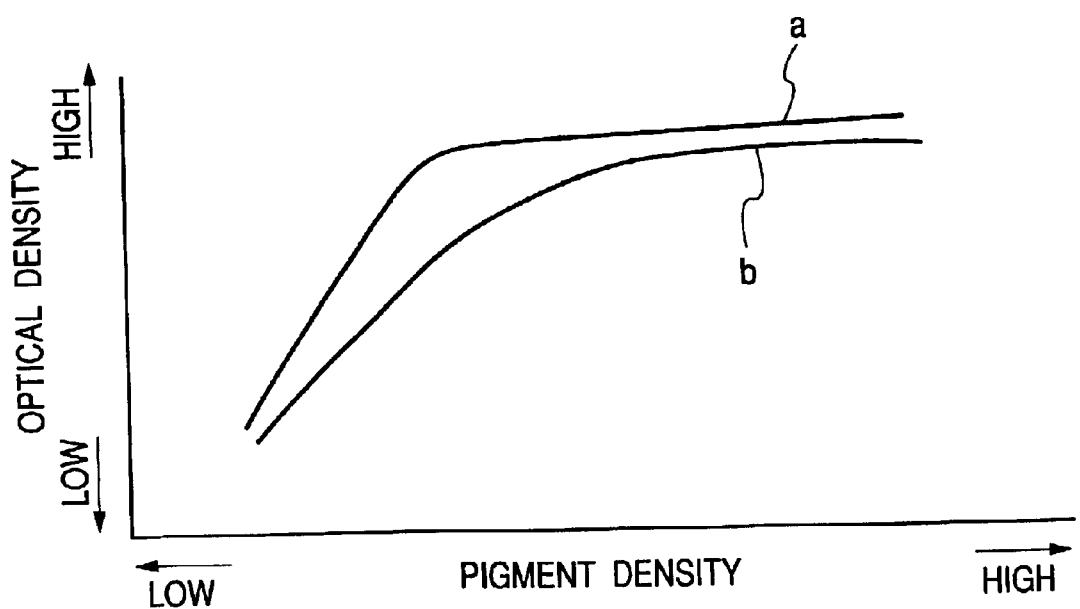
FIG. 15 is a chart showing the relationship between the optical density and the presence or absence of the salt in the ink or the pigment density in the ink.

FIG. 15 is a chart showing the relationship between the pigment density and the optical density of the image formed by each of the aforementioned black ink and a reference ink of an identical composition except for the absence of salt. As will be apparent from FIG. 15, these inks provide the eventually comparable optical densities, but the black ink (a) of the present invention reaches a saturation value with a pigment concentration lower than that of the reference black ink (b). Stated differently, the salt addition allows to reduce the pigment concentration in the ink without causing a change in the optical density of the image.

More specifically, in case of containing ammonium benzoate as the salt by about 1 mass %, a concentration of the self dispersion type carbon black of about 4 mass % provides an optical density of the print for example of about 1.4 on the plain paper, which does not change much even by a further increase in the concentration of carbon black. On the other hand, in the salt-free ink, a carbon black concentration of 4 mass % provides an optical density of print of about 1.32 on the plain paper, while a carbon black concentration of 7 or 8 mass % provides an optical density of about 1.35 which substantially constitutes a saturation value.

The difference in such saturation values (1.4 and 1.35) of the optical density is only 0.05 in number, but is clearly recognizable in visual comparison of the respective prints. In this manner, the salt-containing ink provides advantages, in comparison with the salt-free ink, in that a higher optical print density can be provided even at a lower carbon black concentration and that the saturation value itself of the optical density becomes higher. In the foregoing there has been explained an example utilizing the self dispersion type carbon black, but similar phenomena are also observed in the black ink in which carbon black is dispersed with a dispersant.

Also this fact brings about the following advantage. As explained in the foregoing, the salt-containing ink has a wide margin for the carbon black concentration with respect to the optical density of the print. Therefore, in case of filling an ink tank including an absorbent member with such ink and executing a printing operation with such ink tank after a pause over a prolonged period in a same position (for example standing for 6 months with the nozzle positioned upward), it is possible to extremely effectively prevent a visually confirmable difference in the optical density between a print obtained in the early stage of the printing operation and a print immediately before the ink in the ink tank is used up.

Still another effect of salt addition is that the aforementioned ink is excellent in intermittent dischargeability. The intermittent dischargeability is evaluated, in a certain nozzle of the ink jet head, by discharging ink from such nozzle, and, after a pause without the preliminary discharge of ink or the ink suction from the nozzle, judging whether the ink can be discharged in proper manner from the start of ink re-discharge thereafter.

(Ink Characteristics: Ink Discharge Property and Penetration into Recording Medium)

The black ink of the present invention can be used as the ink for writing utensils or that for ink jet recording. The ink jet recording includes a method of discharging an ink droplet by applying mechanical energy to the ink and a method of discharging an ink droplet by bubble generation in the ink under application of thermal energy thereto, and the ink of the present invention is advantageously applicable to such methods.

In case of employing the black ink of the present invention for the ink jet recording, such ink is preferably provided with such characteristics as to be dischargeable from an ink jet head. From the standpoint of the dischargeability from the ink jet head, the ink is preferably provided with a viscosity of 1 to 15 mPa·s and a surface tension of 25 mN/m or higher, more preferably a viscosity of 1 to 5 mPa·s and a surface tension of 25 to 50 mN/m.

For representing the penetrability of the ink into the recording medium, there is known a Ka value determined by the Bristow method. By representing the penetrability of ink by the ink amount V per 1 m², the amount V (mL/m²=$\mu$m) of ink penetrating the recording medium after the lapse of a predetermined time t from the discharge of the ink droplet is represented by the following Bristow's equation:

$$V=Vr+Ka(t+tw)^{1/2}$$

Immediately after the deposition of the ink droplet onto the surface of the recording medium, the ink is mostly absorbed by the irregularities (surface coarseness) on the surface of the recording medium and scarcely enters the interior of the recording medium. The duration of such state constitutes a contact time (tw), and the ink amount absorbed in the irregularities of the recording medium during such contact time is Vr.

Beyond such contact time after the ink deposition, the penetration into the recording medium increases in proportion to a ½ power of the time exceeding such contact time, namely (t−tw). Ka is a proportional coefficient of such increase, and corresponds to the penetration speed. The Ka value can be measured by a dynamic ink penetrability testing apparatus according to the Bristow method (for example, Dynamic Penetration Test Apparatus S (trade name): supplied by Toyo Seiki Mfg. Co.).

In the ink in the aforementioned embodiments of the present invention, the Ka value is preferably selected less than 1.5, more preferably in a range at least equal to 0.2 but less than 1.5, for further improving the quality of the recorded image. In case the Ka value is less than 1.5, it is estimated that the solid-liquid separation takes place in an early stage of ink penetration into the recording medium, thereby providing a high-quality image with extremely low feathering.

The Ka value of the Bristow method in the present invention is measured by employing a plain paper (for example, PB paper to be used for a copying apparatus or a page printer (laser beam printer) of an electrophotographic process, or for a printer of an ink jet recording process, both supplied by Canon Inc.) as the recording medium. The environment of measurement is assumed to be an ordinary office environment, for example, with a temperature of 20 to 25° C. and a humidity of 40 to 60%.

Also the composition of the aqueous medium allowing to achieve the aforementioned characteristics preferably includes, for example, glycerin, trimethylol propane, thiodiglycol, ethylene glycol, diethylene glycol, isopropyl alcohol or acetylene alcohol.

(Color Ink)
(Coloring Material)

The coloring material to be employed in the color ink of the present invention is not particularly restricted but is preferably a water-soluble dye of xanthene, triphenylmethane, anthraquinone, monoazo, disazo, trisazo, tetrazo or copper phthalocyanine family. The ink can be prepared by incorporating therein one of such dyes or a combination of two. The content of the coloring material in the ink is preferably within a range of 0.1 to 15.0 mass %, more preferably 0.5 to 5.0 mass % with respect to the total amount of the ink. In the following there will be shown examples of anionic dye.

(Yellow Coloring Material)
C.I. Direct yellow 8, 11, 12, 27, 28, 33, 39, 44, 50, 58, 85, 86, 87, 88, 89, 98, 100, 110 and 132;
C.I. Acid yellow 1, 3, 7, 11, 17, 23, 25, 29, 36, 38, 40, 42, 44, 76, 98 and 99;
C.I. Reactive yellow 2, 3, 17, 25, 37 and 42;
C.I. Food yellow 3.

(Red Coloring Material)
C.I. Direct red 2, 4, 9, 11, 20, 23, 24, 31, 39, 46, 62, 75, 79, 80, 83, 89, 95, 197, 201, 218, 220, 224, 225, 226, 227, 228, 229 and 230;
C.I. Acid red 6, 8, 9, 13, 14, 18, 26, 27, 32, 35, 42, 51, 52, 80, 83, 87, 89, 92, 106, 114, 115, 133, 134, 145, 158, 198, 249, 265 and 289;
C.I. Reactive red 7, 12, 13, 15, 17, 20, 23, 24, 31, 42, 45, 46 and 59;
C.I. Food red 87, 92 and 94.

(Blue Coloring Material)
C.I. Direct blue 1, 15, 22, 25, 41, 76, 77, 80, 86, 90, 98, 106, 108, 120, 158, 163, 168, 199 and 226;
C.I. Acid blue 1, 7, 9, 15, 22, 23, 25, 29, 40, 43, 59, 62, 74, 78, 80, 90, 100, 102, 104, 117, 127, 138, 158 and 161;
C.I. Reactive blue 4, 5, 7, 13, 14, 15, 18, 19, 21, 26, 27, 29, 32, 38, 40, 44 and 100.

(Black Coloring Material)
C.I. Direct black 17, 19, 22, 31, 32, 51, 62, 71, 74, 112, 113, 154, 168 and 195;
C.I. Acid black 2, 48, 51, 52, 110, 115 and 156;
C.I. Food black 1 and 2.

Recently, since the ink jet image is realized in high quality comparable to that of conventional silver halide photography, it is required that such image not only has satisfactory image quality but also storability over a prolonged period.

Such requirement can be met by employing an ink set in which the color inks for forming a color image have a substantially same light fastness ΔE, and it is rendered possible in this manner to prevent the image deterioration after prolonged storage without distorting the color balance.

The color of the color ink can be represented by a color space such as CIELAB. In the CIELAB color space, a color can be represented by three factors L*, a*, b*, wherein L* defines the color brightness within a range from 0 (black) to 100 (white), while a* and b* define the color hue and the chromaticity.

ΔE defines the difference between two colors and becomes larger as the difference between the two colors becomes larger, as indicated by:

$$\Delta E = [(L^*_1 - L^*_2)^2 + (a^*_1 - a^*_2)^2 + (b^*_1 - b^*_2)^2]^{1/2} \quad (1)$$

namely $$\Delta E = (\Delta L^{*2} + \Delta a^{*2} + \Delta b^{*2})^{1/2} \quad (2).$$

Such ΔE can be used to measure the light fastness of the color ink. More specifically, a large value of ΔE between immediately after printing and after exposure to light indicates a large fading by light. If ΔE is same for different colors, there is obtained an impression that the deterioration in image quality is small because the color balance is retained, though the discoloration over the entire image is noticeable to a certain extent. Also the discoloration over the entire image is less noticeable if the remaining rate of the reflective intensity is high in each color.

Further, it is preferred that the discoloration of the ink by light in a pseudo indoor light fading test corresponding to 3 years or longer does not exceed 10 in ΔE in the CIELAB color space representation system.

In case of including dense and pale magenta inks in the ink set of the present invention, it is preferred that such dense and pale magenta inks at least employ a coloring material represented by the following general formula (I):

General Formula (I)

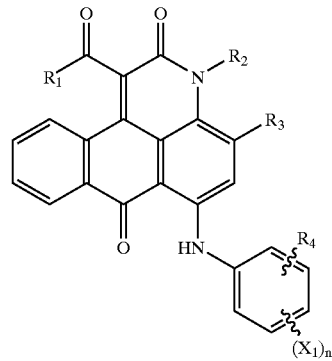

[12]

wherein $R_1$ stands for a substituted or unsubstituted alkoxy radical or a substituted or unsubstituted aryl radical; $R_2$ and $R_4$ independently stand for a hydrogen atom or a substituted or unsubstituted alkyl radical; $R_3$ stands for a hydrogen atom, a substituted or unsubstituted alkyl radical, a substituted or unsubstituted alkoxy radical, a substituted or unsubstituted aryloxy radical or a halogen atom; $X_1$ stands for a carboxyl radical, a salt thereof, a sulfonic acid or a salt thereof; and n indicates an integer of 1 to 2.

In the following there are shown examples of the coloring material represented by the general formula (I), but such examples are not restrictive.

Also two or more of such coloring materials may be employed simultaneously in the same ink.

The specific examples of the coloring material of the present invention, contained in the general formula (I), have the following structures:

Example compound 1

[13]

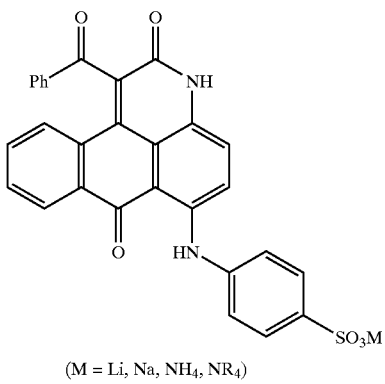

(M = Li, Na, NH$_4$, NR$_4$)

Example compound 2

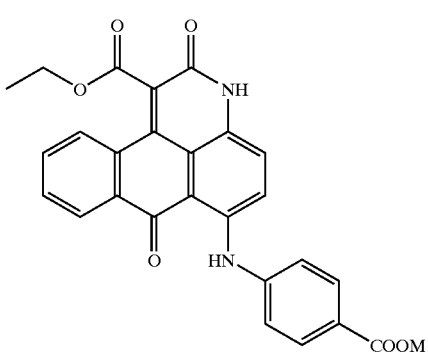

Example compound 4

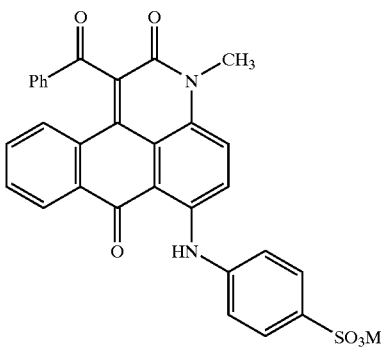

Example compound 3

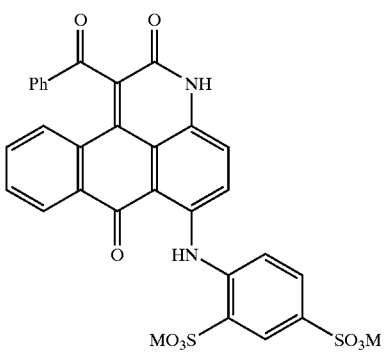

Example compound 5

[14]

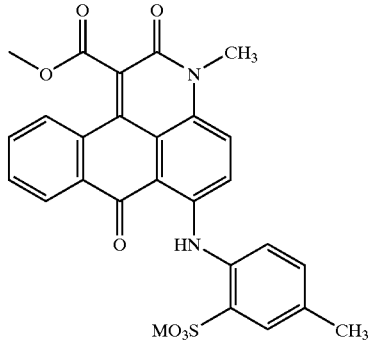

Example compound 6

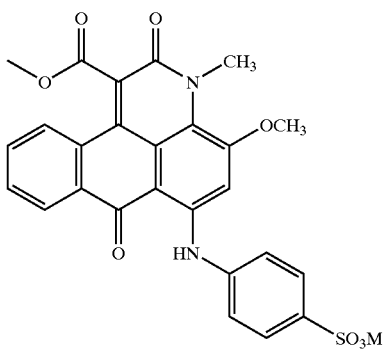

Example compound 7

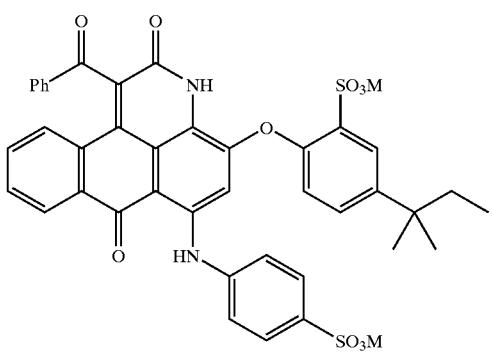

It is further preferred that the coloring material of the dense magenta ink includes at least one of the coloring materials represented by the general formula (I) and at least one of the coloring materials represented by the following general formulas (II) and (III) and the coloring materials having a xanthene structure:

General Formula (II)

[15]

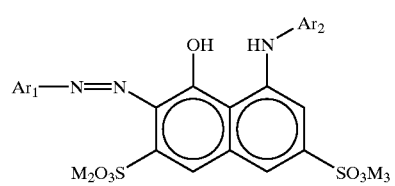

wherein $Ar_1$ stands for an aryl radical having at least a substituent selected from a carboxyl radical, a salt thereof, a sulfonic acid and a salt thereof, or a substituted or unsubstituted alkyl radical; $Ar_2$ stands for an acetyl radical, a benzoyl radical, a 1,3,5-triazine derivative, a $SO_2$—$C_6H_5$ radical or a $SO_2$—$C_6H_4$—$CH_3$ radical; and $M_2$ and $M_3$ are counter ions and represent an alkali metal, ammonium or organic ammonium.

General Formula (III)

[16]

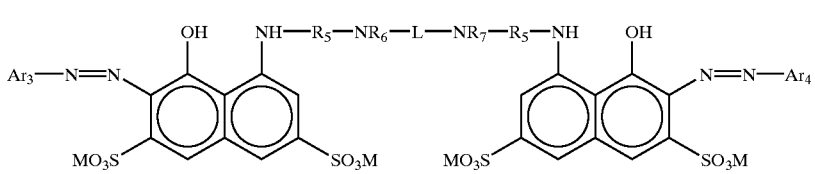

wherein $Ar_3$ and $Ar_4$ independently represent an aryl radical or a substituted aryl radical; at least one of $Ar_3$ and $Ar_4$ has a substituent consisting of a carboxyl radical, a salt thereof, a sulfornic acid or a salt thereof; M is a counter ion selected from an alkali metal, ammonium and organic ammonium; $R_5$ stands for a 1,3,5-triazine residue or a 1,3,5-triazine derivative residue; $R_6$ and $R_7$ independently represent a hydrogen atom, an alkyl radical, a substituted alkyl radical, an alkenyl radical, a substituted alkenyl radical, an aralkyl radical or a substituted aralkyl radical, or an atomic group required for constituting a perhydroxyazine nucleus in cooperation with N; and L stands for an organic divalent connecting radical.

Also the coloring material of the general formula (II) to be employed in the present invention can be, for example, C.I. Reactive red 80 or compounds of the following structures, or those of the structures disclosed in the Japanese Patent Application Laid-open Nos. 8-73791 and 11-209673:

[17]

Example compound 8

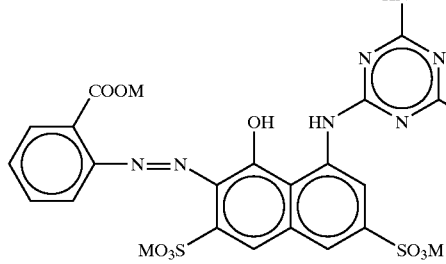

(M = Li, Na, NH$_4$, NR$_4$)

[18]

-continued

Example compound 9

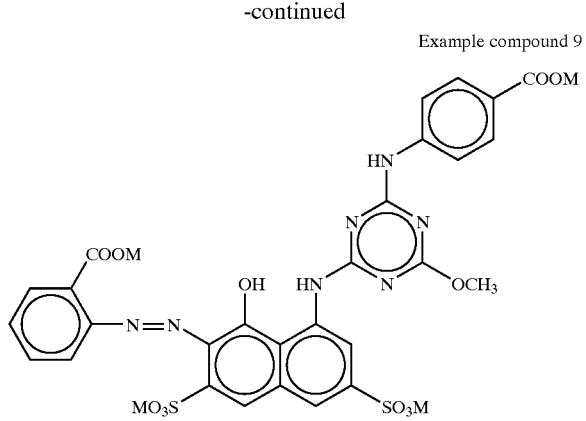

Example compound 10

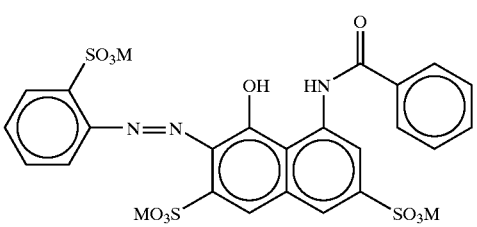

Example compound 11

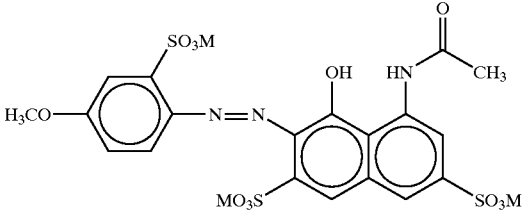

Example compound 12

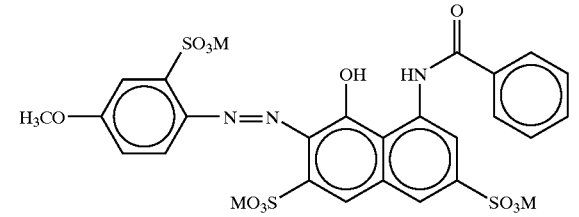

Example compound 13 (C.I. Acid red 249)
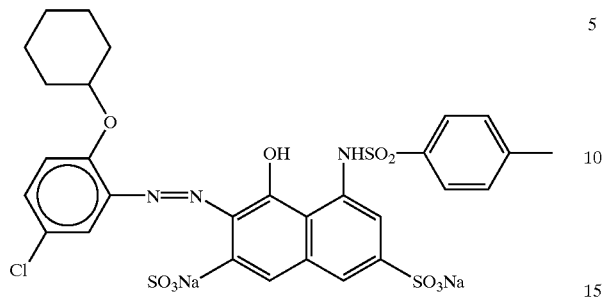
The coloring material of the general formula (III) to be employed in the present invention has the following structure:
Example compound 14
[19]
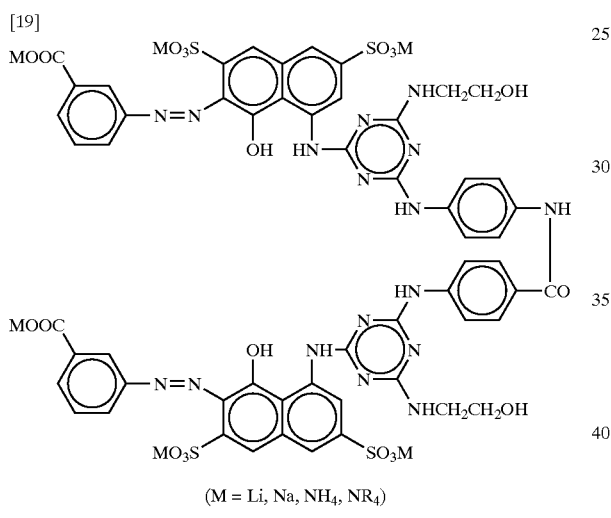
(M = Li, Na, NH$_4$, NR$_4$)
Example compound 15
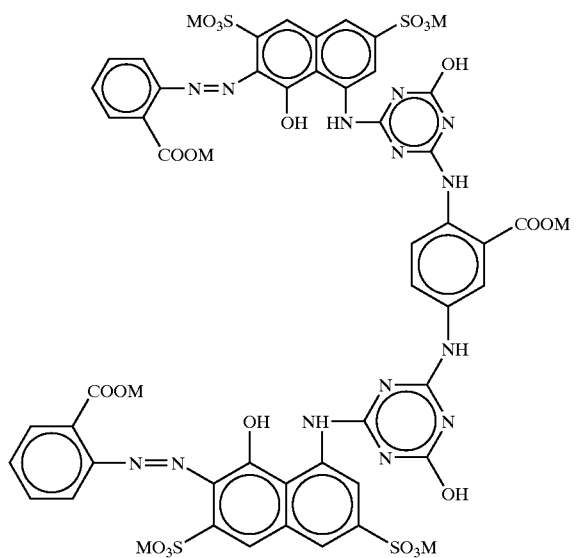
Example compound 16
[20]
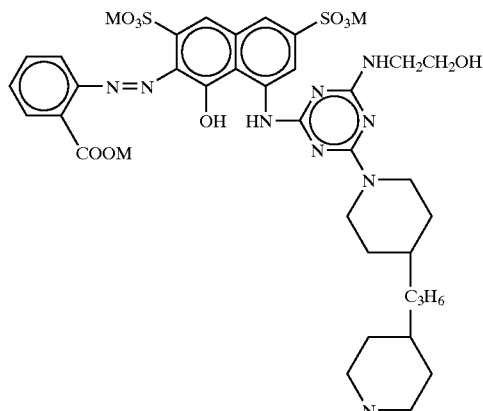
Example compound 17
[21]
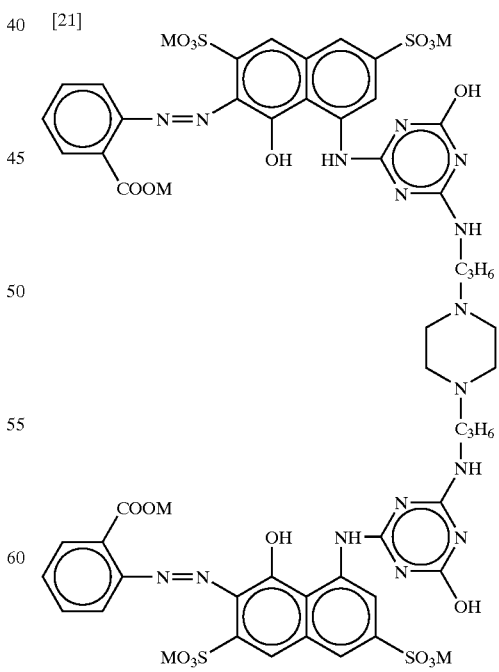

Example compound 18

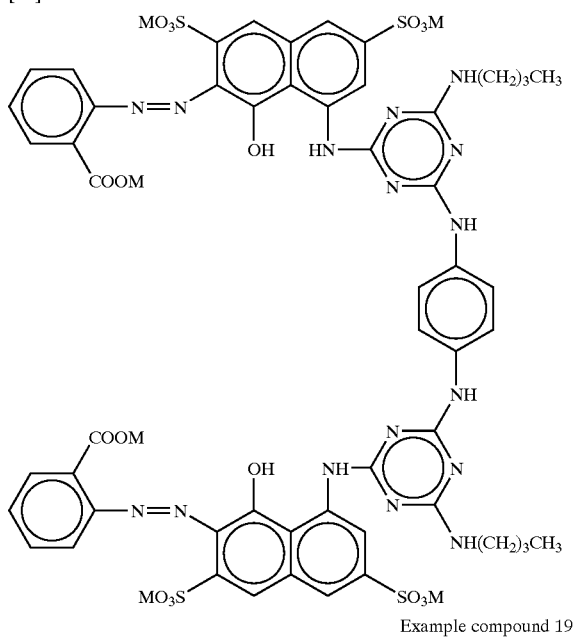

Example compound 19

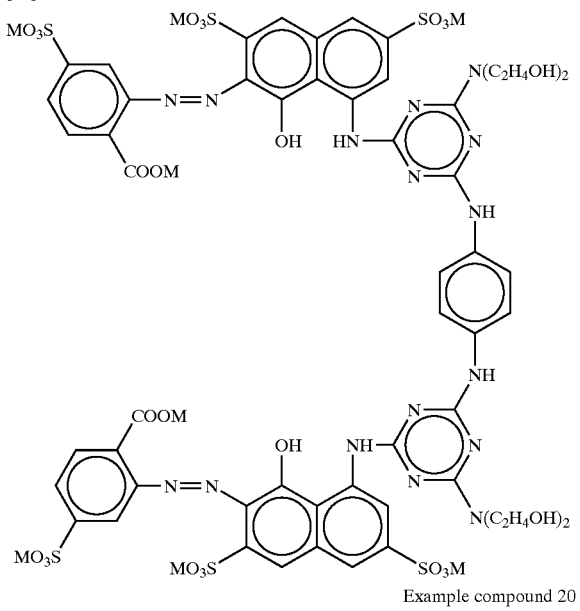

Example compound 20

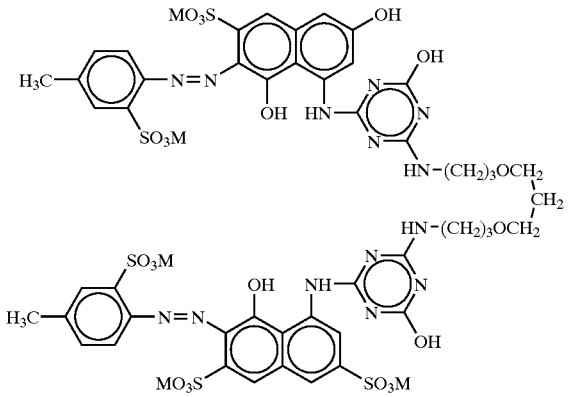

Example compound 21

Example compound 22

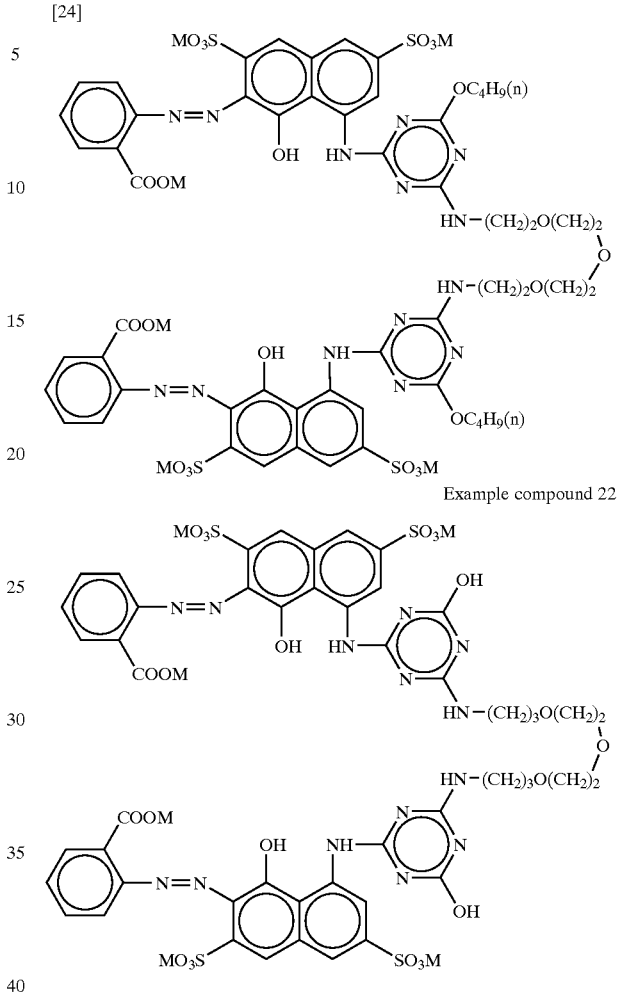

The specific examples of the coloring material having the xanthene structure include C.I. Acid red 52, 92, 94 and 289.

In the dense magenta ink of the present embodiment, the mass ratio of the coloring material represented by the general formula (I) and the coloring material other than that of the general formula (I) (including at least one of coloring materials represented by the general formula (II) and (III) and those having the xanthene structure) is preferably within a range of 95:5 to 20:80 in consideration of the effect of providing a clear color, a high image density and superior light fastness. A mass ratio of the compound of the general formula (I) larger than this range may be unable to provide the clear color and the desired image density depending on the recording medium, while a smaller mass ratio may be unable to provide the sufficient light fastness.

In case of including dense and pale cyan inks in the ink set of the present invention, a copper phthalocyanine dye is preferable as the coloring material of these inks. Specific examples of the coloring material of copper phthalocyanine structure include C.I. Acid blue 249, C.I. Direct blue 86, C.I. Direct blue 199 and C.I. Direct blue 307. Such copper phthalocyanine dye may be used in combination with another cyan coloring material. In case of such combined use, the mass ratio of the copper phthalocyanine dye and another dye is preferably within a range of 95:5 to 20:80.

In case of including a yellow ink in the ink set of the present invention, the coloring material therein is preferably Direct Yellow 132.

A black ink may be further included in the ink set of the present invention, and, in such case, it is preferred that the discoloration of the ink by light in a pseudo indoor light fading test corresponding to 3 years or longer does not exceed 10 in ΔE in the CIELAB color space representation system.

In case of using a dye-based black ink, the dye employable in such ink can be at least one selected from those represented by the following general formulas (IV) to (VI):

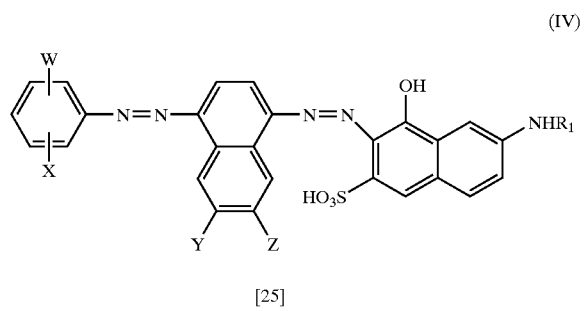

(IV)

[25]

wherein W stands for a carboxyl radical; X stands for a hydrogen atom, a carboxyl radical or a sulfon radical; Y stands for a hydrogen atom, a carboxyl radical or a sulfon radical; Z stands for a hydrogen atom, a carboxyl radical or a sulfon radical; and $R_1$ stands for a hydrogen atom, an alkyl radical substituted with at least either of a carboxyl radical or an alkoxyl radical, a substituted or unsubstituted phenyl radical or a substituted or unsubstituted alkanoyl radical.

In the general formula (IV), the carboxyalkyl radical represented by $R_1$ is preferably a carboxyalkyl radical in which the alkyl radical has 1 to 6 carbon atoms, more preferably the alkyl radical has 1 to 4 carbon atoms.

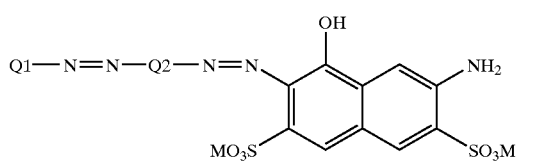

(V)

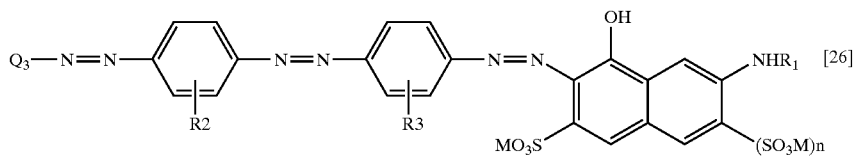

(VI)

wherein Q1 stands for a phenyl or naphthyl radical substituted with at least one selected from lower alkylcarbonylamino radicals and lower alkoxy radicals, or a naphthyl radical substituted with a sulfon radical; Q2 stands for a naphthyl radical substituted with a sulfon radical or a phenyl radical substituted with a lower alkoxy radical; R2 and R3 independently stand for a lower alkyl radical, a lower alkoxy radical or a lower alkylcarbonyl radical; R4 stands for a hydrogen atom or a phenyl radical substituted with a sulfon radical; n indicates an integer 0 or 1; and M is an alkali metal or an eventually substituted ammonium radical.

In the dye structure represented by the general formulas (V) and (VI), the lower alkylcarbonylamino radical is preferably an alkylcarbonylamino radical with 1 to 4 carbon atoms, while the lower alkoxy radical is preferably an alkoxy radical with 1 to 4 carbon atoms, and the lower alkyl radical is preferably an alkyl radical with 1 to 4 carbon atoms.

Specific examples of the dye represented by the aforementioned general formula (V) include those of the following structural formulas 23 to 27:

[27]

Example compound 23

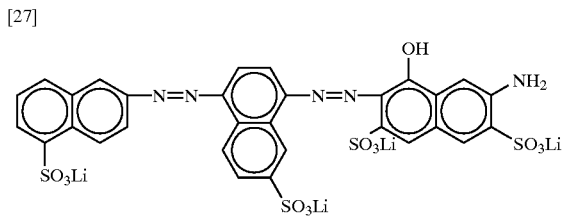

Example compound 24

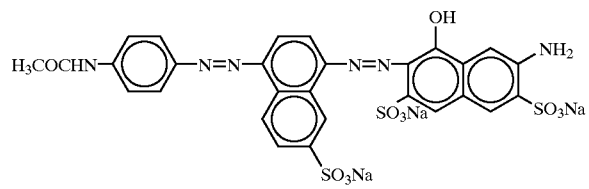

Example compound 25

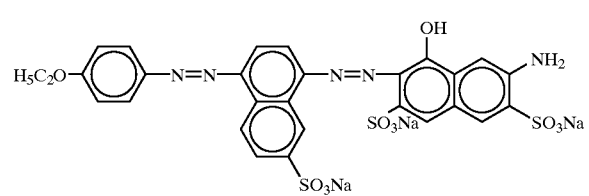

-continued

Example compound 26

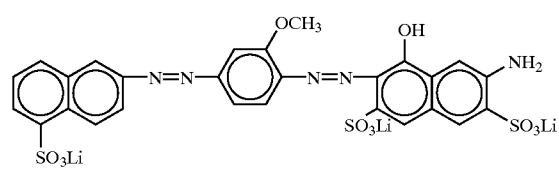

-continued

Example compound 27

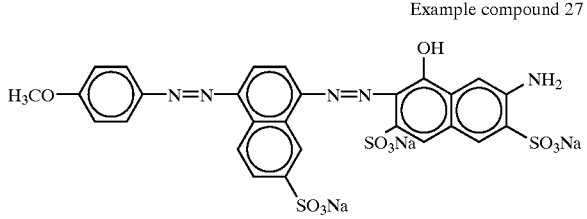

Also specific examples of the dye represented by the aforementioned general formula (VI) include those of the following structural formulas 28 to 32:

visible region is made larger than the light absorbance of the second color ink at the maximum absorption wavelength in the visible region. Among these two color inks, the second color ink is preferably such that, in case of forming a 100% solid print portion with such second color ink on a recording medium (for example BC paper), such print portion is visually recognizable. Such second color ink has, for example, a light absorbance at the maximum absorption wavelength in the visible region within a range at least equal to 1/20 but less than 1 of the light absorbance of the first color ink at the maximum absorption wavelength in the visible region. More specifically, in case of employing the coloring materials explained in the foregoing, the first color ink preferably contains such coloring material in an amount Example compound 28

[28]

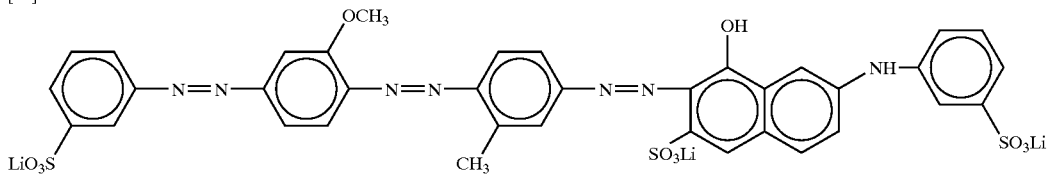

Example compound 29

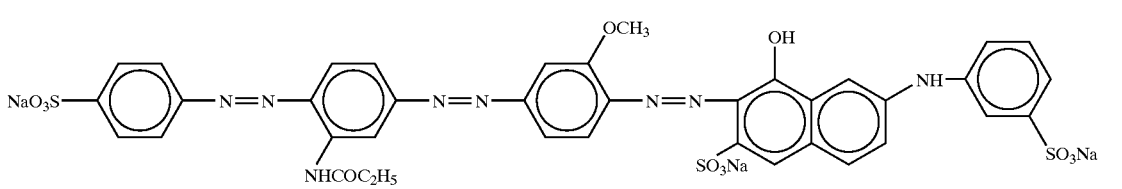

Example compound 30

Example compound 31

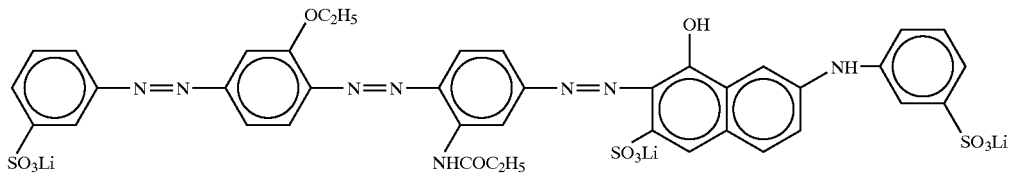

Example compound 32

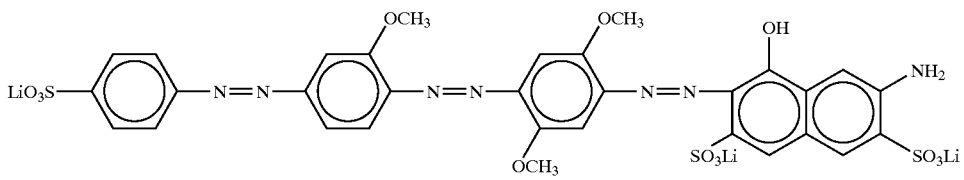

[M′:NH(C$_2$H$_4$OH)$_3$]

In addition, there may also be used C.I. Direct black 17, 19, 32, 51, 71, 90, 108, 146, 154, 168 or 195; and C.I. Food black 1 or 2. Such black dyes may be used singly, or in suitable combinations within the scope of the present invention.

Another ink set of the present invention includes, as two or more color inks, a first color ink and a second color ink of a same color, in which the light absorbance of the first color ink at the maximum absorption wavelength in the exceeding 2 mass % with respect to the total mass of the ink, so that the second color ink preferably has a concentration of the coloring material which does not exceed 2 mass % with respect to the total mass of the ink and is suitably selected so as to meet the above-mentioned condition.

It is further preferred that the light fastness of the image obtained with the second color ink is comparable to or better than that of the image obtained with the first color ink. In case the ink set includes the first color ink and the second color ink as magenta color inks, the second color ink preferably contains the coloring material represented by the foregoing general formula (I) as the sole coloring material. Also in case the ink set includes the first color ink and the second color ink as cyan color inks, the cyan ink with a lower concentration of the coloring material preferably contains Direct Blue 199 as the sole coloring material.

Further, a preferred ink set of the present invention is composed of color inks in which the image obtained with each color ink shows ΔE after light fastness test not exceeding 20, preferably 15.

(Solvent)

The solvent or dispersion medium for the ink, for the aforementioned coloring materials for the color inks, can be for example water or a mixture of water and a water-soluble organic solvent. The water-soluble organic solvent can be similar to that explained in the foregoing for the black ink. Also in case of depositing such color ink onto the recording medium by an ink jet method (for example bubble jet method), the ink is preferably prepared with desired viscosity and surface tension so as to obtain excellent ink jet discharging characteristics as explained in the foregoing.

(Penetrability of Color Ink)

In the above-described color inks, a Ka value for example equal to or larger than 5 is preferable in allowing formation of a high quality color image on the recording medium. The ink having such Ka value, having high penetrability into the recording medium, can suppress color bleeding between the adjacent images even in case of forming images of at least two colors selected from yellow, magenta and cyan, and, also in case of forming an image of a secondary color by superposing these inks, can effectively suppress the bleeding between such image and an adjacent image of a different color, since each ink has high penetrability. The Ka value of the color ink can be adjusted to such value by a known method such as addition of a surfactant or addition of a penetrable solvent such as glycolether. The amount of addition can be selected suitably.

The color ink of the present invention preferably contains, as explained in the foregoing, a dye which impairs the dispersion stability of a pigment in the black ink when mixed therewith, or a dye and an additive which impairs the dispersion stability of the black ink when mixed therewith. More specifically, it is possible to prepare the color ink according to any of the aforementioned embodiments (1), (2) and i) to v) relating to the reactivity between the black ink and the color ink, or to prepare the color ink and the black ink, suitably selecting the aforementioned materials employable in these inks.

(Humidifier)

In order to retain the humidifying property of the ink, a solid humidifier component such as urea, a urea derivative or trimethylol propane can also be used as an ink component. The content of the solid humidifier component such as urea, a urea derivative or trimethylol propane in the ink is preferably within a range of 0.1 to 20.0 mass %, more preferably 3.0 to 10.0 mass % with respect to the ink. In addition to the foregoing components; the ink of the present invention may further contain; if necessary, other additives such as a surfactant, a pH adjusting agent, an antirusting agent, an antiseptic, an antimold agent, an antioxidant, an antireducing agent, an evaporation accelerator, a chelating agent, a water-soluble polymer, etc.

(Light Fastness Test)

For evaluating discoloration by light in the present invention, there is employed a light fastness test, and such light fastness test is preferably executed under a condition simulating indoor solar light coming through a window, in consideration of the environment where the image is stored. Also the amount of light irradiation in the light fastness test is preferably 6,000 klux·hr or higher in consideration of the storage over a prolonged period. For example, a test for 100 hours under an illumination intensity of 63 klux corresponds to a storage for 3 years or longer, assuming that the indoor irradiation amount of solar light per day is 5 klux·hr.

The light fastness test is preferably executed under a condition simulating indoor solar light coming through a window, more preferably under a condition of ISO standard 10977 simulating the indoor solar light coming through a window.

The ISO standard defines an illumination intensity of 6 klux, which however requires an excessively long test time in a test for 6,000 klux·hr or larger. Therefore, the test time may be shortened by increasing the illumination intensity, if the obtained result does not show reciprocity failure.

(Recording Medium)

The medium for printing the image for light fastness test is not particularly limited, but is preferably a special medium, which means a recording medium having, on a substrate, a porous layer consisting of inorganic particles (consisting for example of alumina hydrate), a layer of porous particles (consisting for example of porous particles and a binder), or a layer of porous polymer (consisting for example of a mixture of organic particles and inorganic particles), and which is generally called glossy paper, coated paper or glossy film.

(Recording Unit, Ink Jet Recording Apparatus and Ink Jet Recording Method)

The recording unit of the present invention is composed of an ink container portion (ink tank) and an ink jet head for discharging ink supplied from the ink container portion, and these components are connected in an integrated state. The ink container and the ink jet head may assume, if necessary, a detachably mounted configuration.

The ink container portion provided in the recording unit is provided with a portion for containing ink of at least a color, and such ink of at least a color is composed of an ink containing a polyvalent metal salt. There may also be assumed a configuration including portions for respectively containing a plurality of polyvalent metal salt containing inks, or a configuration including portions for respectively containing at least a polyvalent metal salt containing ink and at least an ink not containing the polyvalent metal salt. The ink jet head employed in this recording unit adopts, at least in the portion for discharging the polyvalent metal salt containing ink, a configuration utilizing a discharge method in which the bubble is opened through to the external air (hereinafter abbreviated as BTJ method).

Among the recording units utilizing the BTJ method, there will be explained, in the following, a preferred example provided with an ink jet head which is disclosed in the Japanese Pat. Application Laid-open No. 11-188870.

Figure 1B:
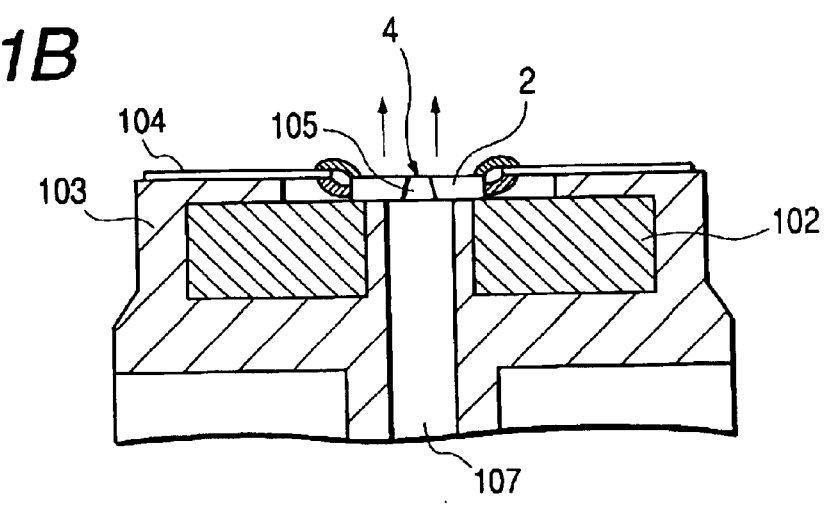

FIGS. 1A and 1B are respectively an external perspective view and a cross-sectional view along a line 1B—1B in FIG. 1A, schematically showing the configuration of a recording unit utilizing such BTJ method.

Referring to FIGS. 1A and 1B, an Si element substrate 2 is provided with a heater 1 of an electrothermal converting element to be explained later and a discharge port 4 opposed to the heater 1, both being prepared by a thin film forming technology. The element substrate 2 is provided with a plurality of discharge ports 4, arranged in staggered manner and in two arrays as shown in FIG. 1A. The element substrate 2 is fixed by adhesion to a part of an L-shaped support member 102. A wiring substrate 104 is fixed also on the support member 102, and the wiring portion of the wiring substrate 104 is electrically connected with the wiring portion of the element substrate 2 by wire bonding. The support member 102 is composed for example of aluminum in consideration of workability and cost. A mold member 103 is provided for supporting the support member 102 by insertion of a part thereof into the interior of the mold member 103, and also for supplying liquid (for example ink) through a liquid supply path 107 provided therein, from a liquid reservoir (not shown) to a discharge port provided in the element substrate 2. The mold member 103 also serves as a mounting and positioning member, for detachably fixing the entire liquid discharge head of the present embodiment on a liquid discharge apparatus to be explained later.

In the element substrate 2, there is provided a communicating path 105, penetrating through the substrate 2, for supplying the discharge port with the liquid supplied through the liquid supply path 107 of the mold member 103. The communication path 105 is also connected with liquid flow paths communicating with the discharge ports, thereby serving as a common liquid chamber.

Figure 2A:
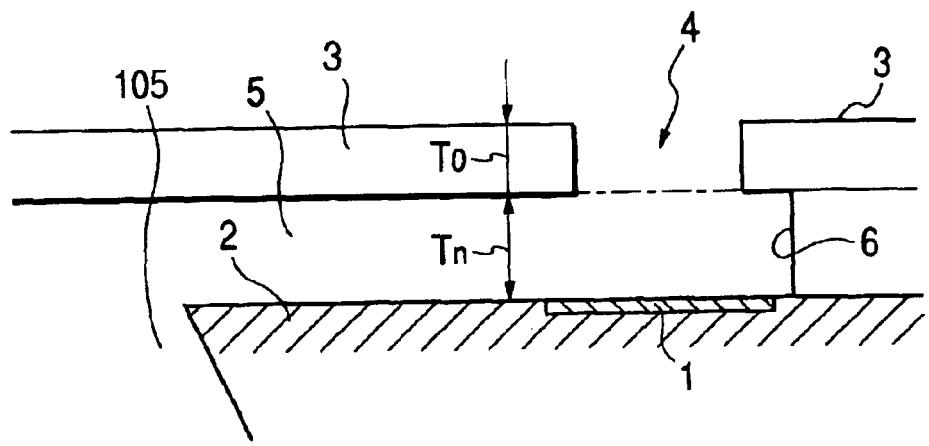
Figure 2B:
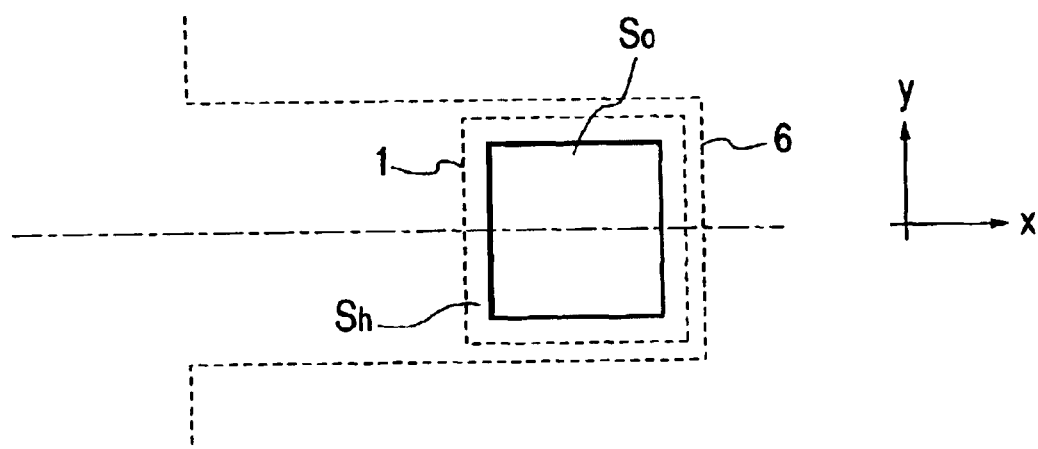

FIGS. 2A and 2B are views showing the principal part of the liquid discharge head shown in FIGS. 1A and 1B, wherein FIG. 2A is a lateral cross-sectional view of a discharge port seen from a side thereof, and FIG. 2B is a plan view of the discharge port shown in FIG. 2A.

As shown in FIGS. 2A and 2B, a heater 1 of an electrothermal converting element is provided in a predetermined position on the element substrate 2. The heater 1 is so formed as to have a rectangular contact surface with the ink. Above the heater 1, there is provided an orifice plate 3 constituting a discharge port forming member and provided with a discharge port 4 which is a rectangular aperture in a position opposed to the aforementioned heater 1. In the present example, the discharge port 4 is constituted by a rectangular aperture, but such form is not restrictive and it may also be formed in a circular form. Also in the discharge port 4, the area of the aperture at the upper side is selected equal to that at the lower side, but the area of the aperture at the upper side may be selected smaller than that at the lower side, thereby forming the lateral walls of the discharge port 4 in a tapered shape. Such configuration allows to improve the discharge stability.

As shown in FIG. 2A, the gap between the heater 1 and the orifice plate 3 is equal to the height $T_n$ of the liquid flow path 5 and is defined by the height of a liquid flow path wall 6. In case the liquid flow path 5 extends in the X-direction as shown in FIG. 2B, the discharge port 4 communicating with the liquid flow path 5 is arranged in plural units in the Y-direction perpendicular to the X-direction. The plural liquid flow paths 5 communicate with the communicating path 105 shown in FIG. 1B and serving as the common liquid chamber. The distance from the surface of the heater 1 to the discharge port 4 can be represented by $(T_0 T_n)$ wherein $T_0$ is the thickness of the orifice plate 3, corresponding to the distance from the discharge port 4 to the liquid flow path 5. In the present embodiment, for example, $T_0 = 12 \mu m$ and $T_n = 13 \mu m$.

The recording head of BTJ method of such configuration can be prepared by a known method described for example in the aforementioned Japanese Pat. Application Laid-open No. 11-188870.

In the present embodiment, there may be employed a single drive pulse of a pulse width for example of 2.9 $\mu$sec and a drive voltage of 9.84 V which is 1.2 times of the discharge threshold value. Also, as an example, the ink constituting the liquid to be employed in the present embodiment has the following physical properties:

Viscosity: $2.2 \times 10^{-2}$ N/sec
Surface tension: $38 \times 10^{-3}$ N/m
Density: 1.04 g/cm$^3$.

In the following there will be explained an embodiment of the liquid discharge method of the present invention, utilizing the liquid discharge head of the above-described configuration.

FIGS. 3A to 3H are cross-sectional views, in a direction same as that in FIG. 2A, showing the function of the liquid discharge head embodying the liquid discharge method of the present invention. FIG. 3A shows a state where a membrane-shaped bubble is generated on the heater; FIG. 3B shows a state at about 1 $\mu$sec after the state shown in FIG. 3A; FIG. 3C shows a state at about 2.5 $\mu$sec after the state shown in FIG. 3A; FIG. 3D shows a state at about 3 $\mu$sec after the state shown in FIG. 3A; FIG. 3E shows a state at about 4 $\mu$sec after the state shown in FIG. 3A; FIG. 3F shows a state at about 4.5 $\mu$sec after the state shown in FIG. 3A; FIG. 3G shows a state at about 6 $\mu$sec after the state shown in FIG. 3A; and FIG. 3H shows a state at about 9 $\mu$sec after the state shown in FIG. 3A. In FIGS. 3A to 3H, a portion with hatching in the horizontal direction indicates the orifice plate or the liquid flow path wall, while a portion filled with short lines indicates liquid and the density of such short lines indicates the speed of the liquid. More specifically, the liquid has a higher speed in a portion where the short lines are given in a high density, and a lower speed in a portion where the short lines are given in a low density.

At first, as shown in FIG. 3A, a bubble 301 is generated in the liquid flow path 5 above the heater 1 by energization of the heater 1 in response for example to a recording signal, and such bubble grows with a rapid increase in volume in about 2.5 $\mu$sec as shown in FIGS. 3B and 3C. The height of the bubble 301 at the maximum volume thereof exceeds the upper surface of the orifice plate, but the pressure of the bubble in such state is reduced to about a fraction of the atmospheric pressure to one-several-tenth thereof. The bubble 301 then enters a phase of volume decrease from its maximum volume at about 2.5 $\mu$sec from the generation thereof, and a meniscus 302 starts to be formed at about the same time. The meniscus drops or is retracted toward the heater 1 as shown in FIG. 3D.

The word "drop" or "dropping" used herein does not means dropping in the direction of gravity but means a displacement toward the electrothermal converting element regardless of the direction of mounting of the head.

Since the dropping speed of the meniscus 302 is larger than the contracting speed of the bubble 301, the bubble 301 reaches a state opened through to the air in the vicinity of the lower surface of the discharge port 4 as shown in FIG. 3E, at about 4 $\mu$sec from the generation of the bubble. In this state, the liquid (ink) in the vicinity of the central axis of the discharge port 4 drops toward the heater 1, because the liquid retracted toward the heater 1 by the negative pressure in the bubble 301 prior to reaching the opened state through to the air retains the speed toward the heater 1 by inertia even after reaching such open through state. The liquid (ink) dropping toward the heater 1 reaches the surface thereof as shown in FIG. 3F at about 4.5 $\mu$sec after the generation of the bubble 301 and spreads so as to cover the surface of the heater 1 as shown in FIG. 3G. The liquid spreading so as to cover the surface of the heater 1 has a speed vector in the horizontal direction along the surface of the heater 1 but loses the speed vector in a direction crossing the surface of the heater 1, for example in the vertical direction, thereby tending to remain on the surface of the heater 1 and pulling the liquid, positioned in the upper part and having a speed vector in the direction of discharge. Thereafter a liquid pillar 303 between the liquid spreading on the surface of the heater 1 and the upper liquid (main liquid drop) becomes thinner and is separated at the center of the surface of the heater 1, at about 9 μsec after the generation of the bubble 301, into a main drop retaining the speed vector in the discharge direction and the liquid which is spread over the surface of the heater 1. The position of such separation is preferably inside the liquid flow path, more preferably at a position closer to the electrothermal converting element than to the discharge port. Thus the main drop is discharged from the central portion of the discharge port 4 without deviation in the discharge direction and lands on a predetermined position on the recording surface of the recording medium. The liquid spread on the surface of the heater 1, which would constitute a satellite drop flying after the main drop in the conventional technology, remains on the surface of the heater 1 and does not fly. Since the discharge of the satellite drop can be suppressed in this manner, it is possible to prevent the splashing phenomenon which tends to be generated by the discharged satellite drops and to securely prevent the smearing of the recording surface of the recording medium with the floating mist.

Therefore, the ink containing polyvalent metal salt in combination with the head of BTJ method allows not only to prevent smearing of the recording surface as explained in the foregoing, but also to prevent deposition of the floating mist of the ink to the vicinity of the discharge port of the black ink recording head, thereby preventing solidification of the black ink or a distorted print with the black ink.

The aforementioned drawbacks can be more effectively prevented by limiting the color ink which contains the polyvalent metal salt (for example including the polyvalent metal salt only in the cyan ink) and employing such ink in a recording system capable of reducing the bleeding phenomenon by image processing or the like.

In the present embodiment, the main drop has a discharge volume of about $9 \times 10^{-15}$ m$^3$, a discharge speed of about 16 m/sec and a refilling frequency of about 11 kHz, but these conditions are not restrictive.

Furthermore, in case the black ink is used in combination with color inks, for example inks of three colors of cyan, magenta and yellow, it is preferred to employ the polyvalent metal salt containing ink at least in one of the color inks, more preferably in all the color inks, and to employ different discharge methods for the black ink and for the color inks. It is more preferred to adopt the BTJ method for the color inks containing polyvalent metal salt and to adopt, for the black ink, a discharge method in which the bubble does not reach an opened state through to the external air (hereinafter called BJ method).

For incorporating such two different discharge methods in an image recording apparatus, there may be employed, for example, a method of combining plural recording units of different discharge methods, a method of utilizing a recording unit of a configuration containing discharge ports driven by different discharge methods, or a method of utilizing such recording units in combination.

The configuration containing discharge ports driven by different discharge methods within a single recording unit is advantageous for simplifying the configuration of the image recording apparatus. The ink jet head suitable for such configuration preferably has a configuration in which a liquid flow path is formed between a bottom portion including a heater surface (coming into direct contact with ink for heating ink) of the electrothermal converting element and a ceiling portion consisting of a discharge port forming member and the ink is discharged from a discharge port provided in a position opposed to the heater surface in a direction crossing the direction thereof, for example in a direction perpendicular thereto. The ink jet head of such configuration is preferably designed according to at least one of the following three standards (1) to (3):

(1) The distance $OH_{Bk}$ ($T_0 + T_n$ in FIGS. 2A and 2B) between the heater surface to which the black ink is supplied and the discharge port does not exceed 100 μm;

(2) The discharge speed $V_{Bk}$ and the discharge amount $Vd_{Bk}$ of the black ink and the discharge speed $V_{Cl}$ and the discharge amount $Vd_{Cl}$ of the color ink, particularly of the polyvalent metal salt containing ink, satisfy following consitions:
$V_{Cl} > V_{Bk} \geq 8$ m/sec and
$Vd_{Bk} > Vd_{Cl}$;

(3) The distance $OH_{Bk}$ from the heater surface to which the black ink is supplied to the discharge port, the distance $h_{Bk}$ between such heater surface and the discharge port forming member ($T_n$ in FIGS. 2A and 2B), the distance $OH_{Cl}$ from the heater surface to which the color ink, particularly the polyvalent metal salt containing ink, is supplied to the discharge port and the distance $h_{Cl}$ between such heater surface and the discharge port forming member satisfy following conditions:
$h_{Bk} > h_{Cl}$ and
$OH_{Bk} > OH_{Cl}$.

FIGS. 4 to 9D show a preferred example of the configuration of a recording unit provided with discharge portions of BJ method and BTJ method.

This recording unit has a configuration in which an ink jet head and ink tanks constituting ink reservoirs are detachably mounted. There are provided four ink tanks for respectively containing inks of four colors of black, magenta, yellow and cyan. These ink tanks are detachably set at the side of a sealing rubber H1800 of the ink jet head, thereby being rendered individually exchangeable, thereby achieving reduction of the running cost in printing or recording.

In the following, each of the components will be explained further.

(Ink Jet Head)

Figure 5:
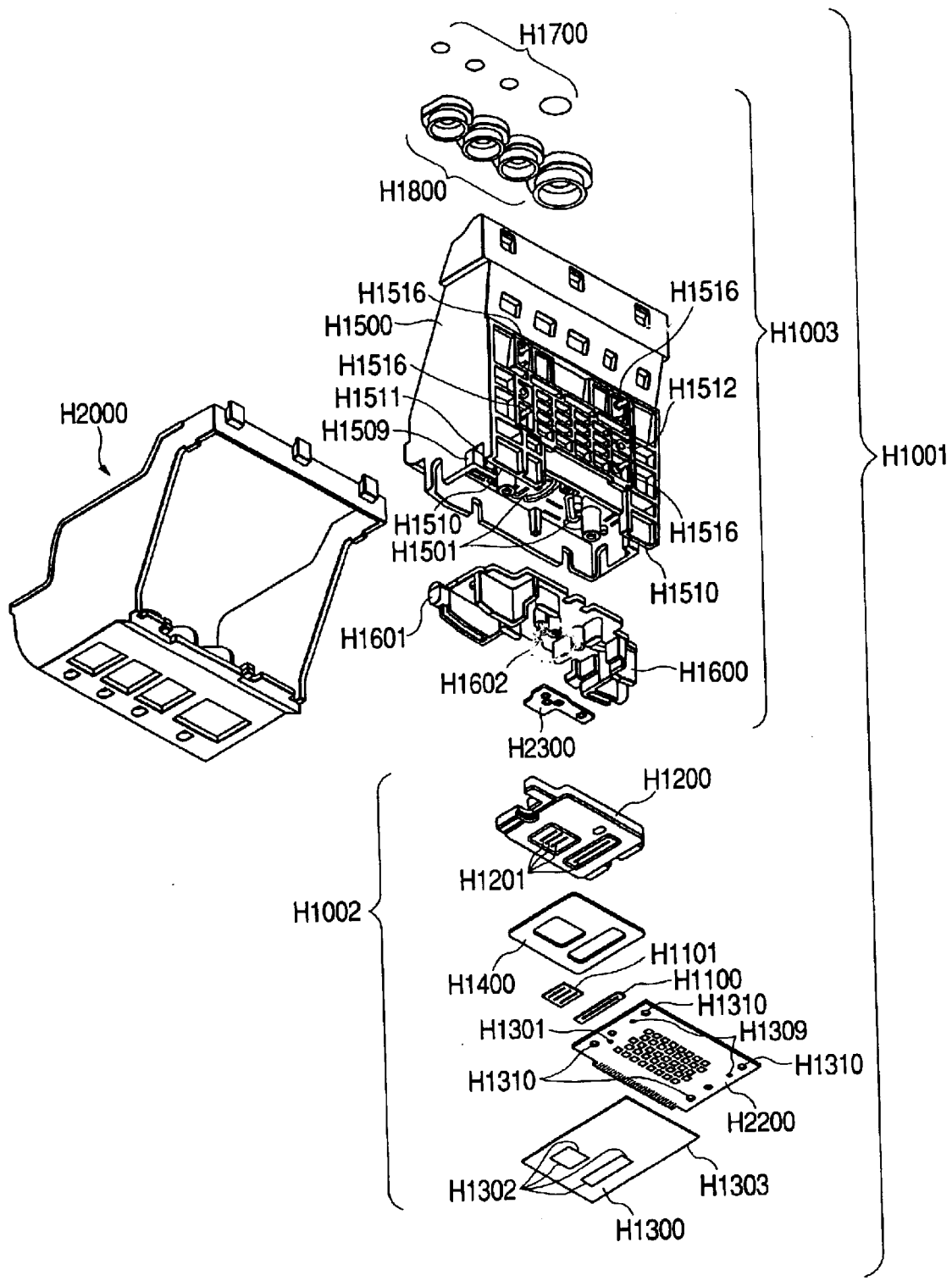
FIG. 5 is an exploded perspective view showing the configuration of the recording unit shown in FIG. 4.

As shown in an exploded perspective view in FIG. 5, an ink jet head (recording head) H1001 is composed of a recording element unit H1002, an ink supply unit H1003 and a tank holder H2000. The recording element unit H1002 is composed of a first recording element substrate H1100, a second recording element substrate H1101, a first plate (first support member) H1200, an electric wiring tape (flexible wiring board) H1300, an electric contact board H2200, and a second plate (second support member) H1400, while the ink supply unit H1003 is composed of an ink supply member H1500, a flow path forming member H1600, a joint seal member (rubber) H2300, a filter H1700 and a seal rubber H1800.

(Recording Element Unit)

Figure 6:
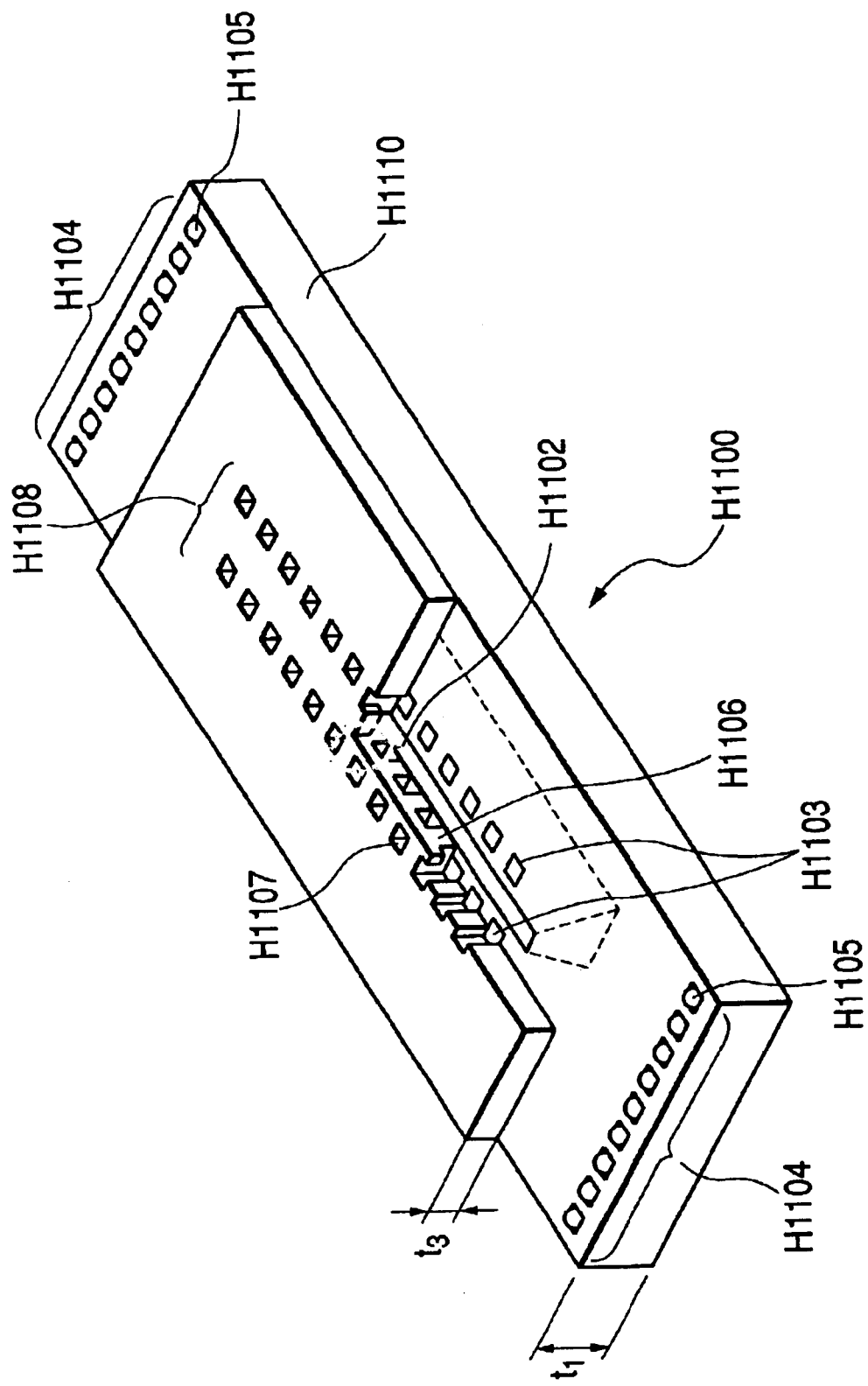
FIG. 6 is partially cut-off perspective view showing the configuration of a recording element substrate.

FIG. 6 is a partially cut-off perspective view showing the configuration of the first recording element substrate H1100. The first recording element substrate H1100 is provided, on a surface of an Si substrate H1110 of a thickness of 0.5 to 1 mm, with plural electrothermal converting elements H1103 for ink discharge and electric wirings for example of Al for supplying the converting elements H1103 with electric power, both formed by film forming technologies. There are also formed plural ink flow paths (liquid flow paths) and plural discharge ports, corresponding to the electrothermal converting elements H1103 by a photolithographic process, and an ink supply aperture H1102 for supplying the plural liquid flow paths with the ink is so formed as to open on the opposite surface (rear surface).

Figure 4:
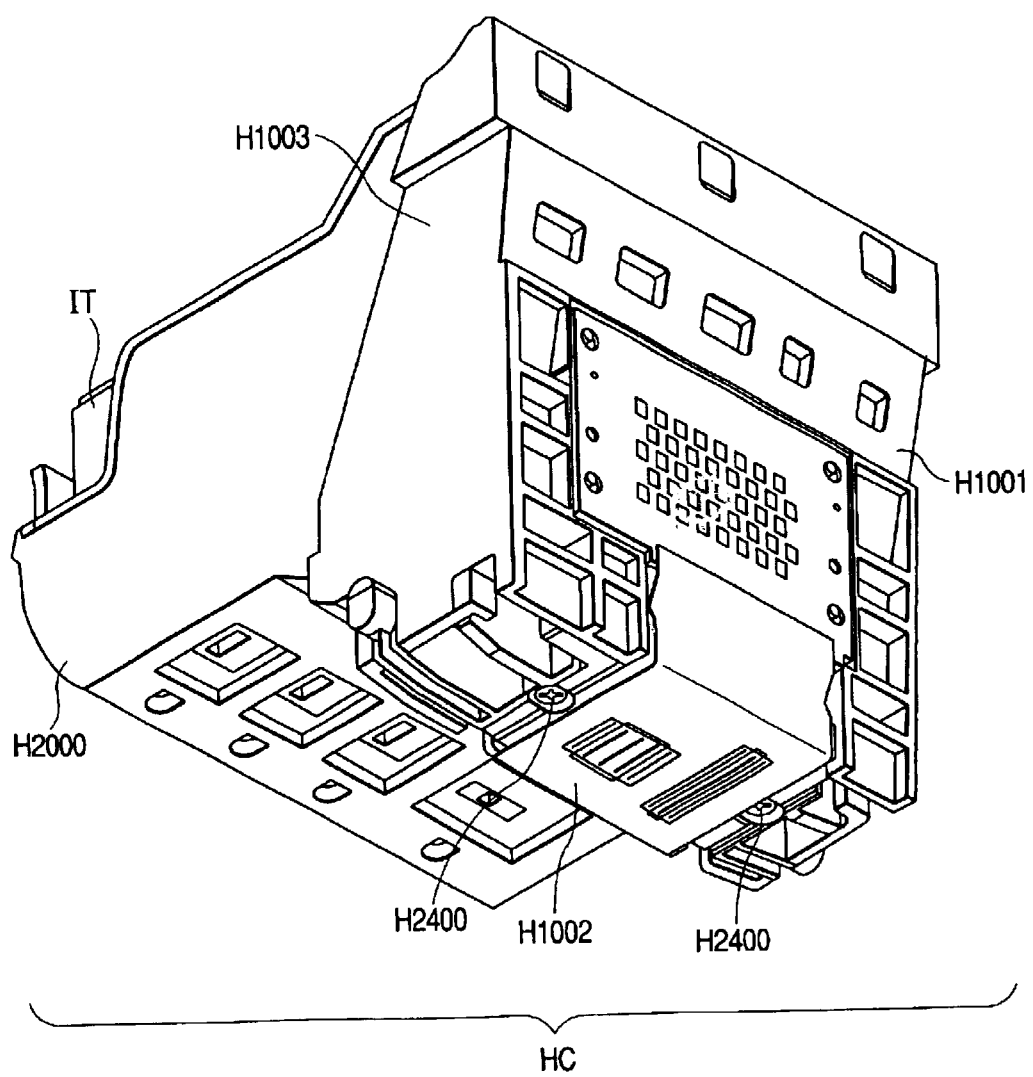
FIG. 4 is a perspective view showing the configuration of a recording unit of the present invention.

The recording element substrate H1100 is adhered and fixed to the first plate H1200 shown in FIG. 4, whereby the ink supply aperture H1102 is connected with the ink connecting aperture H1201 of the first plate H1200. Also the second plate H1400 having an aperture is adhered and fixed to the first plate H1200, and the electric wiring tape H1300 is supported by the second plate H1400 so as to be electrically connected to the recording element substrate H1100. The electrical wiring tape H1300 serves to apply electrical signals for ink discharge to the first recording element substrate H1100, and is provided with electric wirings corresponding to the recording element substrate H1100 and an external signal input terminal H1301 positioned on the electric wiring portion and receiving the electrical signals from the main body of the printer, and such external signal input terminal H1301 is positioned and fixed on the rear side of the ink supply member H1500. In FIG. 4, IT indicates the ink tank and HC indicates the recording head cartridge.

In case the Si substrate 1110 has a crystalline oritation <100> along the wafer surface and <111> in the direction of depth, the ink supply aperture H1102 as an elongated groove-shaped penetrating hole can be formed by anisotropic etching with an angle of about 54.7° of a desired depth with an alkaline etchant (KOH, TMAH, hydrazine etc.). The electrothermal converting elements H1103 are arranged in two arrays across the ink supply aperture H1102 and in mutually staggered manner. The electrothermal converting elements H1103 and the electric wirings such as of Al for electric power supply thereto are formed by film forming processes. Also electrodes H1104 for electric power supply to the electric wirings are arranged on both external sides of the electrothermal converting elements H1103, and bear bumps H1105 for example of Au, formed by a thermal-ultrasonic pressing method. On the Si substrate H1110, flow path walls H1106 and discharge ports H1107, for forming ink flow paths corresponding to the electrothermal converting elements H1103, are photolithographically formed with a resinous material, thereby forming a discharge port group H1108. As the discharge port H 1107 is provided in a position opposed to the electrothermal converting element H1103, the ink supplied from the ink supply aperture H1102 is discharged from the discharge port H1107 by means of a bubble generated by heat generated by the electrothermal converting element H1103.

Figure 7:
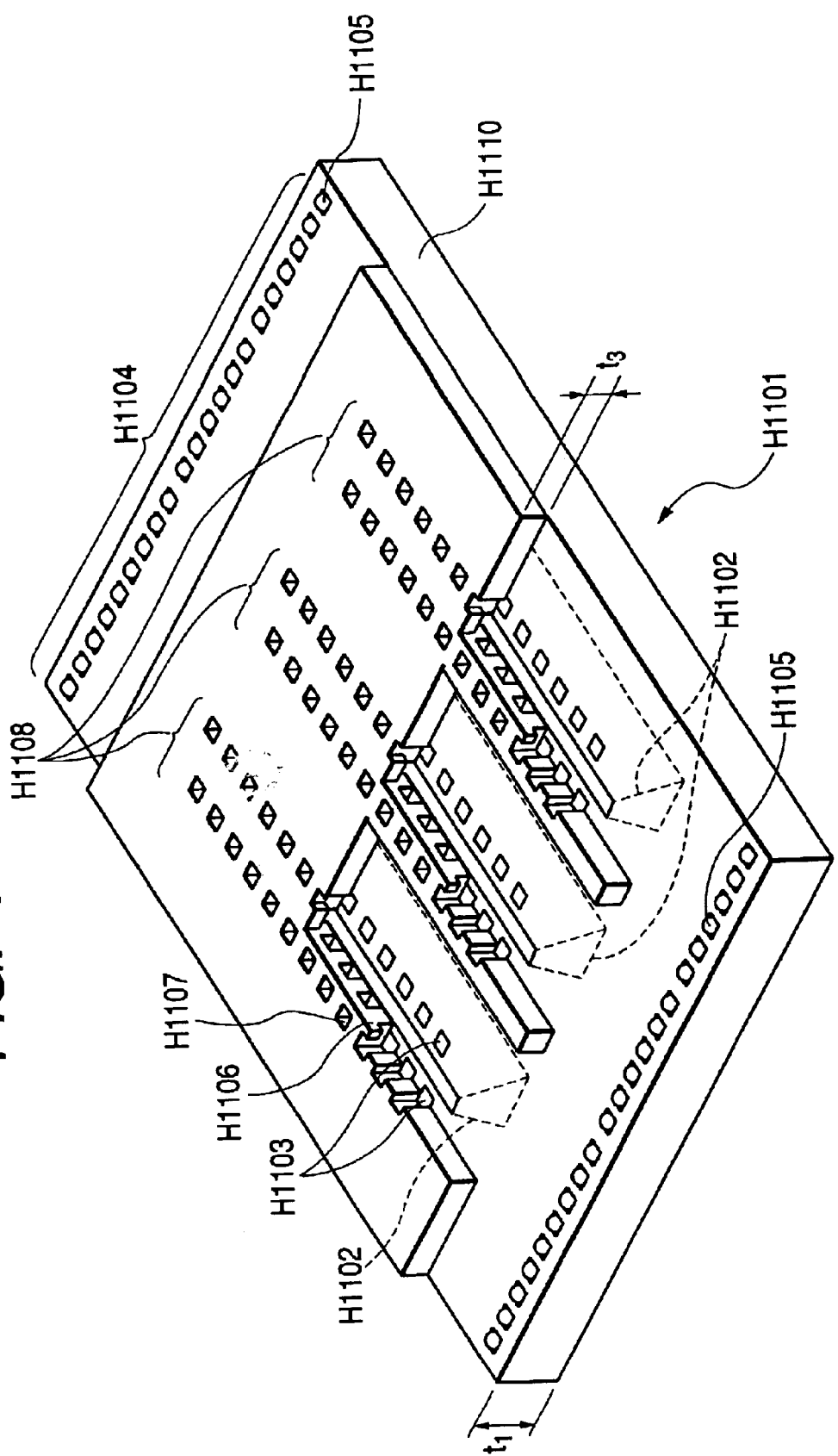
FIG. 7 is partially cut-off perspective view showing the configuration of a recording element substrate.

FIG. 7 is a partially cut-off perspective view for showing the configuration of the second recording element substrate H1101. The second recording element substrate H1101, for discharging inks of three colors; is provide with three ink supply apertures H1102 in parallel manner, and electrothermal converting elements H2204 and ink discharge ports H1107 are formed on both sides of each ink supply aperture H1102. As in the first recording element substrate H1100, ink supply apertures H1102, electrothermal converting elements H1103, electric wirings (not shown), electrodes H1104, etc. are formed on an Si substrate H1110, on which ink flow paths and ink discharge ports H1107 are formed photolithographically with a resinous material. Also as in the first recording element substrate H1100, bumps H1105 such as of Au are formed on the electrodes H1104 for electric power supply to the electric wirings.

The first plate H1200 is composed of alumina ($Al_2O_3$) of a thickness for example of 0.5 to 10 mm. The material of the first plate H1200 is not limited to alumina, but it can also be composed of a material having a thermal expansion coefficient similar to, and a thermal expansion coefficient at least equal to, that of the material constituting the first recording element substrate H1100. More specifically, the first plate H1200 can be composed, for example, of silicon (Si), aluminum nitride (AlN), zirconia, silicon nitride ($Si_3N_4$), silicon carbide (SiC), molybdenum (Mo) or tungsten (W). In the first plate H1200, there are formed an ink connecting aperture H1201 for supplying the first recording element substrate H1100 with black ink and an ink connecting aperture H1201 for supplying the second recording element substrate H1101 with cyan, magenta and yellow inks, and the first recording element substrate H1100 and the second recording element substrate H1101 are precisely positioned and fixed to the first plate H1200 in such a manner that the ink supply apertures H1102 of the recording element substrates respectively correspond to the ink connecting apertures H1201 of the first plate H1200.

Figure 8:
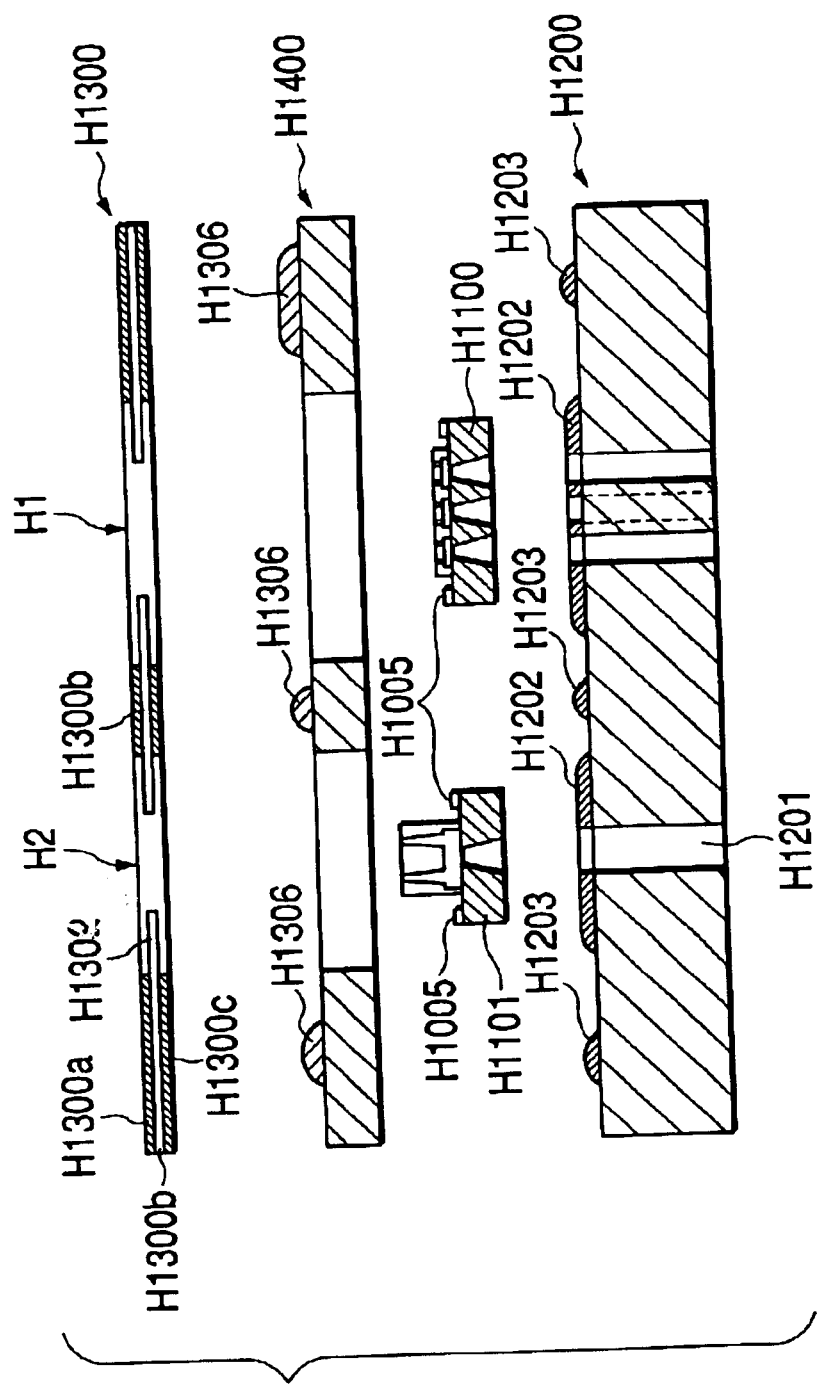
FIG. 8 is an exploded schematic cross-sectional view of a principal part of a recording element unit.
Figure 9A:
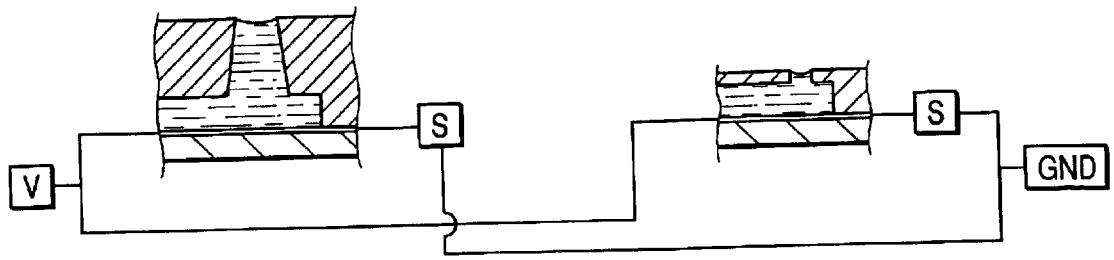
FIGS. 9A, 9B, 9C and 9D are cross-sectional views of a portion including a discharge port for explaining different discharge methods.
Figure 9B:
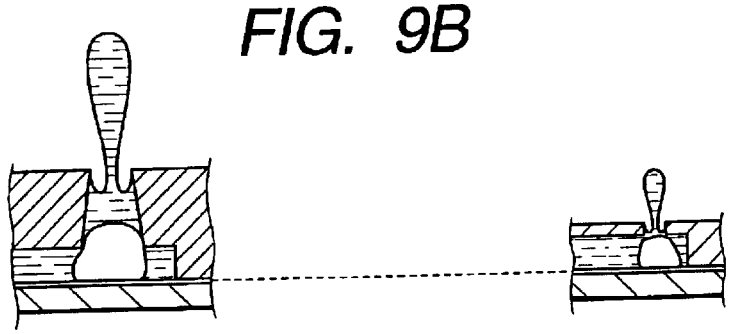
Figure 9C:
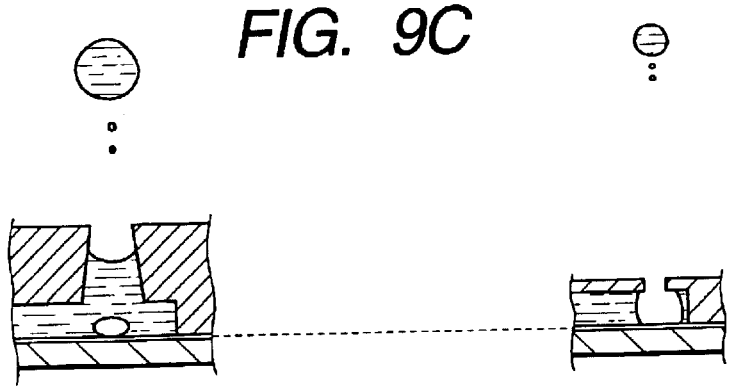
Figure 9D:

The electric wiring tape H1300 is connected, as shown in FIG. 8, to the first recording element substrate H1100, the second recording element substrate H1101, the first plate H1200 and the second plate H1400, and is used for applying electrical signals for ink discharge to the first recording element substrate H1100 and the second recording element substrate H1101.

In the vicinity of a bonding portion, the electrical wiring tape H has a three-layered structure consisting of a polyimide base film H1300$a$ at the top side, a copper foil H1300$b$ as an intermediate layer and a solder resist H1300$c$ at the bottom side. The electrical wiring tape H1300 is further provided with plural device holes (apertures) H1, H2 for accommodating the recording element substrates H1100, H1101, electrode terminals H1302 respectively corresponding to the electrodes H1104 of such recording element substrates H1100, H1101, and an electrode terminal portion positioned at the end of the electrical wiring tape H1300 and serving for electrical connection with an electrical contact board H2200 which has external input terminals H1301 (cf. FIG. 5) for receiving electrical signals from the main body of the printer, and such electrode terminal portion and electrode leads H1302 are connected with wiring patterns of a continuous copper foil. The electrical wiring tape H1300 can be composed for example of a flexible wiring board having two-layered wirings and surfacially covered with resist films. In such case, a reinforcing plate is adhered on the rear (external) side of the external input terminals H1301 for improving the planarity. Such reinforcing plate can be composed for example of a heat-resistant material such as glass fiber-containing epoxy resin or aluminum of a thickness of 0.5 to 2 mm.

The electrical wiring tape H1300 is electrically connected with the first recording element substrate H1100 and the second recording element substrate H1101, for example by thermal-ultrasonic pressing of the bump H1005 on the electrode H1104 of the recording element substrate to the electrode lead H1302 of the electrical wiring tape H1300.

The second plate H1400 is a single plate-shaped member of a thickness for example of 0.5 to 1 mm, and is composed of ceramics such as alumina or a metal material such as aluminum or stainless steel. The material of the second plate H1400 is not limited to such materials, but it can also be composed of a material which has a thermal expansion coefficient similar to, and a thermal conductivity at least equal to, that of the recording element substrates H1100, H1101 and the first plate H1200, and which can attain various physical properties required for the second plate H1400.

The second plate H1400 is provided with apertures respectively larger than the external dimensions of the first recording element substrate H1100 and the second recording element substrate H1101 fixed to the first plate H1200. It is adhered to the first plate H1200 by a second adhesive layer H1203 so as to enable flat electrical connection of the first and second recording element substrates H1100, H1101 with the electrical wiring tape H1300, of which rear side is adhered and fixed with a third adhesive layer H1306.

The electrical connecting portions of the first and second recording element substrates H1100, H1101 with the electrical wiring tape H1300 are sealed with first and second sealants, for protecting the electrical connecting portions from corrosion by ink or external impact. The first sealant principally seals the rear surface side of the connecting portion between the electrode terminal H1302 of the electrical wiring tape and the bump H1105 of the recording element substrate and the external peripheral portion of the recording element substrate, and the second sealant seals the top side of the aforementioned connecting portion.

On an end portion of the electrical wiring tape H1300, there is thermally adhered, for example across an anisotropically conductive film, an electrical contact board H2200 having external signal input terminals H1301 for receiving the electrical signals from the main body of the printer apparatus.

The electrical wiring tape H1300, which is adhered to the second plate H1400, is folded along a side of the first plate H1200 and the second plate H1400 and adhered to a lateral face of the first plate H1200 with a third adhesive layer H1306. The second adhesive preferably has a low viscosity so as to form a thin second adhesive layer H1203 and a high ink resistance. The third adhesive layer H1300 is a thermosetting adhesive layer of a thickness not exceeding 100 μm composed for example of epoxy resin.

(Ink Supply Unit)

The ink supply member H1500 can be formed for example by resin molding. The resinous material for constituting the ink supply member H1500 is preferably a reinforced resinous material containing glass fillers in 5 to 50 mass %, in order to increase rigidity required for maintaining the desired shape.

As shown in FIGS. 4 and 5, the ink supply member H1500 detachably supporting the ink tanks is a component of the ink supply unit H1003 for guiding inks from the ink tanks to the recording element unit H1002, and a flow path forming member H1600 is adhered by ultrasonic fusion to constitute liquid flow paths H1501 from the ink tanks to the first plate H1200. In a joint portion engaging with the ink tanks, a filter H1700 is adhered by fusion for preventing dust intrusion from the exterior, and a sealing rubber H1800 is provided for ink leakage from the joint portion.

There are also provided a mounting guide H1601 for guiding the recording unit to a mounting position on a carriage of an ink jet recording apparatus (image recording apparatus), an engaging portion for mounting and fixing the recording unit on the carriage with a head setting lever, an impinging portion H1509 in the X-direction (carriage scanning direction) for positioning in a predetermined mounting position of the carriage, an impinging portion H1510 in the Y-direction (conveying direction of recording medium) and an impinging portion H1511 in the Z-direction. There is further provided a terminal fixing portion H1512 for positioning and fixing the electrical contact board H2200 of the recording element unit H1002, and plural ribs are formed in the terminal fixing portion H1512 and the vicinity thereof for increasing the rigidity of the surface having such terminal fixing portion H1512.

(Coupling of Recording Element Unit and Ink Supply Unit)

As already shown in FIG. 5, the recording head portion is completed by coupling the recording element unit H1002 to the ink supply unit H1003 and further to the tank holder H2000. Such coupling can be achieved by the following operations.

In order to connect the ink connecting aperture of the recording element unit H1002 (namely the ink connecting aperture H1201 of the first plate H1200) and the ink conecting aperture of the ink supply unit H1003 (namely the ink connecting aperture H1602 of the flow forming member H1600) without causing ink leakage, these members are pressed across a joint seal member H2300 and are fixed with screws H2400. At the same time in this operation, the recording element unit H1002 is precisely positioned and fixed with respect to a reference position in the X, Y and Z directions of the ink supply unit.

The electrical contact board H2200 of the recording element unit H1002 is positioned and fixed on a lateral face of the ink supply member H1500, by means of terminal positioning pins (in two positions) and terminal positioning holes (in two positions). The fixing can be achieved, for example, by caulking the terminal positioning pins provided on the ink supply member H1500, but there may also be utilized other fixing means.

Then a coupling hole and a coupling portion, provided in the ink supply member H1500, for the tank holder, are fitted and coupled with the tank holder H200 to complete the recording head H1001. Thus the recording head is constituted by coupling, for example by adhesion, the tank holder portion consisting of the ink supply member H1500, the flow path forming member H1600, the filter H1700 and the sealing rubber H1800, and the recording element portion consisting of the recording element substrate H1100 and the second plate H1400.

(Recording Unit)

Each ink tank contains therein ink of a corresponding color, and is provided with an ink connecting aperture for supplying the ink in the ink tank to the ink jet head portion. When the ink tank is mounted on the recording head, the ink conecting aperture of the ink tank is pressed to the filter H1700 provided in the joint portion of the recording head, whereby the ink in the ink tank is supplied from the ink connecting aperture, through the liquid flow path H1501 of the ink jet head and the first plate H1200, to the first recording element substrate H1100.

The ink is supplied to the liquid flow path containing the electrothermal converting element H1103 and the discharge port H1107 in the recording head, and is discharged toward the recording medium such as a recording sheet by the thermal energy provided by the electrothermal converting element H1103.

In the present recording unit, the color inks of cyan, magenta and yellow colors are composed of polyvalent metal salt containing inks and are discharged from discharge portions utilizing the BTJ method, while the black ink is discharged from a discharge portion utilizing the BJ method. These portions utilizing different discharge methods are formed on a same electrical contact board H2200 so that highly precise alignment of these portions can be easily achieved by a process including photolithographic steps.

FIGS. 9A to 9D schematically show the steps of ink discharge from the discharge ports utilizing these different discharge methods. In a discharge portion based on the BJ method, the distance (OH) between the discharge port and the heater surface of the electrothermal converting element H1103 is relatively long, so that a bubble A, generated in the ink by the heat generated by the electrothermal converting element H1103, remains in a confined state in the ink until it vanishes. On the other hand, in the BTJ method, since the distance OH is relatively short, the bubble A generated in the ink is opened through to the external air via the discharge port.

These discharge portions are designed according to the aforementioned standards on the distance OH, discharge area, heater size, etc.

Furthermore, in the discharge portion based on the BTJ method, because of the relatively short distance OH, the product of the discharge area $S_0$, which is the internal area of aperture of the discharge port, and the distance OH (namely $S_0 \times OH$) is substantially equal to the discharge amount Vd. For example, for achieving a discharge volume Vd=about 5 pl, there can be selected conditions of OH=25 $\mu$m and a discharge area $S_0$=200 $\mu m^2$ (diameter $\phi$=about 16 $\mu$m).

On the other hand, in the present example, the ink discharge amount Vd of the first recording element substrate H1100 is selected as about 30 pl in order to obtain a fine looking print with the black ink a high print speed. In order to achieve such discharge amount with the BTJ method, there will be required a discharge area $S_0$=1,200 $\mu m^2$ (diameter $\phi$=about 39 $\mu$m) for OH=about 25 $\mu$m. Such configuration usually requires a large-sized heater surface of about 35×35 $\mu$m in order to achieve the desired discharge amount. Also, since the discharge port is larger than the heater surface, the straight flying property of the discharged ink may be impaired. Also the required discharge amount may be achievable even with a small $S_0$ value by increasing the distance OH, but an even larger electrothermal converting element will be required because of the increased flow path resistance. For these reasons, the present example employs the BJ method for the black ink for which a large discharge amount is frequently required, and a configuration of the discharge portion for example with OH=70 to 80 $\mu$m and a discharge area $S_0$=600 to 800 $\mu$m.

In case of ink jet recording with pigment-based ink (black ink), accumulation of scorched products of the ink (kogation) may result on the heater, thereby leading to a loss in the discharge amount or in the discharge speed and resulting in a distortion in the image. Therefore the recording head of the BJ method is preferable for the pigment-based ink which tends to cause accumulation of the scorched products on the heater in comparison with the dye-based ink.

This is because the cavitation effect in the discharge portion of the BJ method can significantly reduce the loss in the discharge amount or the discharge speed resulting from the scorched product accumulation on the heater, and there can thus be attained a suitable balance with the discharge portion of the BTJ method in reliability, durability and image quality.

By employing different discharge methods for the black ink and the color ink as explained in the foregoing, it is rendered possible to select the area of the discharge port for the black ink larger than that for the color ink, thereby effectively increasing the discharge amount of the black ink.

Also, the ink discharge by the BTJ method is almost free from the cavitation phenomenon, thereby effectively reducing the damage to the heater surface and enabling to improve the durability of the ink jet head, even if the ink contains the polyvalent metal salt. In case of discharging ink, containing a polyvalent metal salt, with a discharge method with a large cavitation effect, the protective layer for the heater surface coming into contact with the ink has to be composed of a material capable of maintaining cavitation resistance even under the presence of polyvalent metal salt. On the other hand, employing the BTJ method for discharging the ink containing the polyvalent metal salt allows to relax the requirement for securing the cavitation resistance under the presence of polyvalent metal salt, thereby expanding the freedom of selection for the composition of the protective layer for the heater surface.

<Image Recording Apparatus>

Figure 10:
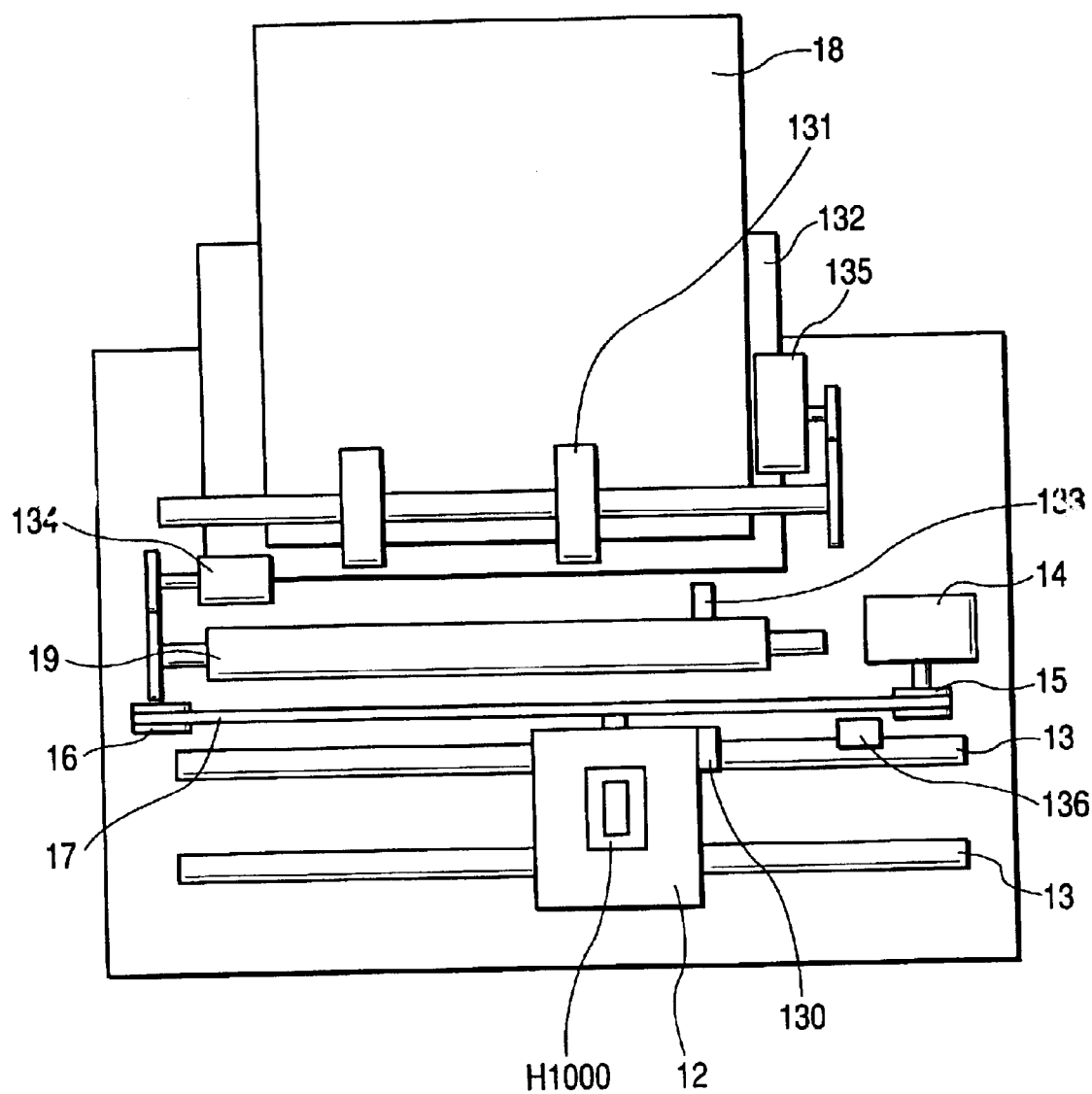
FIG. 10 is a schematic view showing an example of a printer.

FIG. 10 shows an example of the image recording apparatus (printer) of the present invention. In this apparatus, the recording unit H1000 shown in FIG. 4 is replaceably mounted on a carriage 12, which is provided with an electrical connection portion for transmitting drive signals, etc. to the discharge portion through the external signal input terminals of the recording unit H1000.

The carriage 12 is reciprocably supported by and guided along a guide shaft 13 which extends in the main scanning direction in the main body of the apparatus. The carriage 12 is driven through a driving mechanism consisting of a motor pulley 15, an idler pulley 16, a timing belt 17, etc. by a main scanning motor 104, which thus controls the position and motion of the carriage 12. A home position sensor 130 is provided on the carriage 12 to identify the position when the home position sensor 130 on the carriage 12 passes through a shield plate 136.

Recording media 18 such as recording papers or thin plastic sheets are separated and fed one by one from an automatic sheet feeder (ASF) 132 by the rotation of a pickup roller 131 which is driven by a sheet feed motor 135 through gears. The recording medium is further conveyed (sub scanning), by the rotation of conveying rollers 19, through a position (print portion) opposed to the discharge port face of the recording unit H1000. The conveying operation by the conveying rollers 19 is executed by the rotation of an LF motor 134 transmitted through gears. In this operation, judgment whether the sheet has been fed and determination of the leading end position of the sheet are made when the recording medium 18 passes a sensor 133 for detecting the end thereof. The sensor 133 is also used for detecting the actual position of the trailing end of the recording medium 188 and for determining the current recording position from the actual position of the trailing end.

The recording medium 18 is supported on the rear surface thereof by a platen (not shown), so as to form a flat printing surface in the print portion. The recording unit H1000 mounted on the carriage 12 is so supported that the discharge port face thereof protrudes downwards from the carriage 12 and becomes parallel to the recording medium 18, in a space between two pairs of the aforementioned conveying rollers.

The recording unit H1000 is so mounted on the carriage 12 that the direction of array of the discharge ports in each discharge portion crosses the scanning direction of the carriage 12, and executes recording by discharging liquid from such arrays of the discharge ports.

EXAMPLES

In the following, the present invention will be further clarified by an example and a reference example, but the present invention is by no means limited by such example unless the scope of the present invention is exceeded. In the following description, percentage and part are based on the mass unless otherwise specified.

(1) Recording Unit and Image Recording Apparatus

A recording unit of the configuration shown in FIG. 4 was prepared. The first and second recording element substrates were prepared with Si wafers of a substantially same thickness (about 625 $\mu$m). A same resinous material was employed for the first and second recording element substrates, for constituting the discharge port forming members, but the distance OH was made different by changing the solvent and viscosity of the coating solution. More specifically, the discharge port forming member on the second recording element substrate, for the color inks, was prepared by mixing epoxy resin in an amount of 60% with solvents such as MIBK (methylisobutyl ketone), diglyme, etc. to obtain a viscosity of about 60 mPa·s and spin coating such mixture once to obtain a distance OH of about 25 µm. On the other hand, for the first recording element substrate for the black ink, a mixture of epoxy resin of about 60% with solvents such as xylene of a viscosity of about 120 mPa·s was spin coated three times to obtain a distance OH of about 75 µm.

After the spin coating, the discharge port forming member was subjected to patterning, formation of ink flow paths and formation of discharge ports in an ordinary process.

Thus, the first and second recording element substrates are different in the coating solution for preparing the discharge port forming member, the number of coating operations, the patterns thereof, etc. but the same spinner, exposure and developing apparatuses can be used in common by merely changing the operating conditions. There is not required an exclusive process for each substrate, and the recording element substrates of different OH can be prepared through a same process.

It is also possible to use a same Si substrate for both recording element substrates, to prepare the first and second recording element substrates on the same Si substrate, then to prepare bumps on the contact pads and to separate the substrate thereby obtaining these recording element substrates.

In the preparation of the recording head, the second plate was adhered in advance, with an adhesive material, to the first plate. A portion of the second plate, where the first recording element substrate is to be adhered, was coated with a UV/heat settable epoxy adhesive, and the adhesion was executed while positioning by image processing of alignment marks provided on the first recording element substrate by a camera provided on an adhering apparatus. In this operation, the adhesive was so coated as to overflow from the first recording element substrate, and, after the adhesion, UV irradiation was executed while the first recording element substrate was pressed by the adhering apparatus to achieve pre-hardening of the adhesive, thereby immobilizing the adhered first recording element substrate. Then the second recording element substrate was adhered to the first plate in a similar process, and the adhesive was pre-hardened. In these operations, a part of the cameras for alignment work can be used in common, since the first and second recording element substrates have a basically same substrate thickness (excluding the discharge port forming member). Subsequently the adhesive was thermally hardened in an oven. Then, on the second plate positioned on the first plate, to which the first and second recording element substrates and the second plate had been adhered, there was executed positioning (positioning by above-mentioned image processing) with the electrical contacts of the first and second recording element substrates and the electrical wiring tape being adhered with an adhesive material, and the bumps provided on the recording element substrates and the electrode leads provided on the electrical wiring tape being connected by thermal-ultrasonic method. In this configuration, the second plate has such a thickness that the bumps on the first and second recording element substrates of a same thickness and the electrode leads of the electrical wiring tape are in mutually matching positions.

The recording unit was prepared by storing a predetermined ink set in the ink tanks and connecting such ink tanks to the recording head, and was mounted on the carriage of the image recording apparatus (printer) shown in FIG. 10.

The driving voltage at the ink discharge for the electrothermal converting elements of the recording unit of the present example was selected at 19 V for both the black ink and the color ink. The heater surface for the black ink was square of a size of 37 µm, and the discharge port had a circular cross section of a diameter of 25 µm in a direction perpendicular to the ink flow direction. On the other hand, the heater surface for the color ink was square of a size of 26 µm, and the discharge port had a circular cross section of a diameter of 16 µm in a direction perpendicular to the ink flow direction.

The driving pulse, calculated as a single pulse, had a width of about 1.4 to 3 µsec for the black ink and about 6.0 to 11 µsec for the color ink. An appropriate value of the pulse width was obtained from a pulse table stored in the printer, depending on the film formation state of the heater board and the number of driven heaters. Such table values may be obtained by measuring the resistance of each recording element substrate, the threshold pulse width for discharge, etc. in the manufacturing process and storing these values in a ROM provided on the recording head, and read in the printer. It is also possible to obtain an appropriate pulse by reading the heater resistance, etc. of the recording head in the printer.

In general, the discharge speed is lowered as the pulse width becomes shorter. Therefore, the present example employed double pulses for matching the discharge characteristics. In the following there will be given several examples, in which the double pulses are represented by a pre-pulse, a pause and a main pulse, in the unit of microseconds.

TABLE 1

| For black ink | | For color ink | |
| --- | --- | --- | --- |
| Single | Double | Single | Double |
| 1.5 | 0.542-1.583-1.167 | 0.625 | 0.250-0.417-0.500 |
| 2.0 | 0.479-1.146-1.667 | 0.971 | 0.167-0.167-0.833 |
| 2.5 | 0.354-0.688-2.250 | 1.000 | 0.125-0.083-0.958 |

The above-described pulse widths are merely an example and are not restrictive.

On the other hand, in the recording head of the present example, the arrangement density of the electrothermal converting elements is 300 dpi on one side (600 dpi on both sides) for the black ink, which is different from 600 dpi on one side (1,200 dpi on both sides) for the color ink. Such arrangement is to enable printing of both inks at the highest speed (1-pass), regardless of the different discharge amounts of about 30 pl and about 5 pl, respectively, for the black ink and the color ink.

The discharge amount is significantly different for the black ink and the color ink, but the black ink was employed in such a composition as not to spread much on the recording medium, while the color ink was employed in such a composition as to spread (relatively large bleeding) on the recording medium. The black ink and the color ink employed in the present example had the following physical properties:

Black ink:
viscosity: about 2 Pa·s, surface tension: about 40 N/m;
Color ink:
viscosity: about 2 Pa·s, surface tension: about 30 N/m.

(2) Preparation of Ink Set (2-1) Preparation of Pigment Dispersion

At first a pigment dispersion 1 was prepared.

* Pigment dispersion 1

10 g of carbon black with a specific surface area of 230 $m^2/g$ and a DBP absorption amount of 70 mL/100 g and 3.41 of p-amino-N-benzoic acid were well mixed with 72 g of water, then 1.62 g of nitric acid was dropwise added and the mixture was agitated at 70° C. After several minutes, a solution of 1.07 g of sodium nitrite in 5 g of water was added and the mixture was agitated further for 1 hour. The obtained slurry was filtered with filter paper (Toyo Filter Paper No.2; supplied by Advantis Co.), and the filtered pigment particles were sufficiently washed with water, then dried in an oven of 90° C. and added with water to obtain aqueous pigment solution of a pigment concentration of 10 mass %. In this manner, a radical represented in the following chemical formula was introduced into the surface of carbon black:

[29]

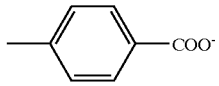

(2-2) Preparation of Ink Set

The above-mentioned pigment dispersion was employed to prepare black ink 1 and black ink 2, as a reference example, in the following manner.

(Black Ink 1)

Pigment dispersion 1: 30 parts
Ammonium benzoate: 1 part
Trimethylol propane: 6 parts
Glycerin: 6 parts
Diethylene glycol: 6 parts
Acetylene glycol ethylene oxide addition product: 0.2 parts
  (Acetylenol EH: supplied by Kawaken Fine Chemical Co.)
Water: remainder (to make 100 parts: hereinafter same)

(Black Ink 2)

Pigment dispersion 1: 30 parts
Trimethylol propane: 6 parts
Glycerin: 6 parts
Diethylene glycol: 6 parts
Acetylene glycol ethylene oxide addition product: 0.2 parts
  (Acetylenol EH: supplied by Kawaken Fine Chemical Co.)
Water: remainder The color ink was prepared by mixing following components, executing sufficient agitation to achieve dissolution and filtering the mixture under a pressure through a microfilter of a pore size of 3.0 µm (supplied by Fuji Photo Film Co.).

(Yellow Ink 1)

Acetylene glycol ethylene oxide addition product: 1.0 part
  (Acetylenol EH: supplied by Kawaken Fine Chemical Co.)
Trimethylol propane: 6 parts
2-pyrrolidone: 6 parts
C.I. Acid yellow 23: 3 parts
Water: remainder (Magenta Ink 1)

Acetylene glycol ethylene oxide addition product: 1.0 part
  (Acetylenol EH: supplied by Kawaken Fine Chemical Co.)
Trimethylol propane: 6 parts
2-pyrrolidone: 6 parts
C.I. Acid red 52: 3 parts
Water: remainder (Cyan Ink 1)

Acetylene glycol ethylene oxide addition product: 1.0 part
  (Acetylenol EH: supplied by Kawaken Fine Chemical Co.)
Trimethylol propane: 6 parts
2-pyrrolidone: 6 parts
C.I. Acid blue 9: 3 parts
Water: remainder Also the following color inks were prepared by adding a divalent metal salt, which is a precipitant for the black pigment, to the foregoing color inks.

(Yellow Ink 2)

Acetylene glycol ethylene oxide addition product: 1.0 part
  (Acetylenol EH: supplied by Kawaken Fine Chemical Co.)
Trimethylol propane: 6 parts
2-pyrrolidone: 6 parts
C.I. Acid yellow 23: 3 parts
Calcium nitrate: 2 parts
Water: remainder (Magenta Ink 2)

Acetylene glycol ethylene oxide addition product: 1.0 part
  (Acetylenol EH: supplied by Kawaken Fine Chemical Co.)
Trimethylol propane: 6 parts
2-pyrrolidone: 6 parts
C.I. Acid red 52: 3 parts
Magnesium nitrate: 2 parts
Water: remainder (Cyan Ink 2)

Acetylene glycol ethylene oxide addition product: 1.0 part
  (Acetylenol EH: supplied by Kawaken Fine Chemical Co.)
Trimethylol propane: 6 parts
2-pyrrolidone: 6 parts
C.I. Acid blue 9: 3 parts
Magnesium nitrate: 2 parts
Water: remainder.

Then ink sets were prepared by combining the above-prepared inks in the following manner:

TABLE 2

|  | Bk | Y | M | C |
|---|---|---|---|---|
| Example 1 | black ink 1 | yellow ink 2 | magenta ink 2 | cyan ink 2 |
| Example 2 | black ink 1 | yellow ink 1 | magenta ink 1 | cyan ink 2 |
| Example 3 | black ink 2 | yellow ink 2 | magenta ink 2 | cyan ink 2 |
| Ref. Ex. | black ink 2 | yellow ink 1 | magenta ink 1 | cyan ink 1 |

Following Table 3 shows the principal compositions of the ink sets of the example 1, the example 2, the example 3 and the reference example.

TABLE 3

|  | Black ink | | Color ink | |
|---|---|---|---|---|
|  | Coloring material | Salt | Coloring material | Polyvalent metal salt |
| Example 1 | anionic self dispersible carbon black | present | dye | present |
| Example 2 | anionic self dispersible carbon black | present | dye | present only for cyan |
| Example 3 | anionic self dispersible carbon black | none | dye | present |
| Ref. Ex. | anionic self dispersible carbon black | none | dye | none |

(2-3) Evaluation

The ink sets of the aforementioned examples 1 to 3 and the reference example were used for recording on commercially available copy paper. The printer was mounted with the recording unit of the configuration shown in FIG. 1 as explained in (1).

This printer was used for evaluating the bleeding and white haze in the ink sets of the aforementioned examples and reference example, and the density difference between a black image area formed by superposing the color ink and the black ink and a black image area formed solely with the black ink, by the following method and criteria.

In the following, a description "Bk: 100% duty, Col: 15% duty" means that the black ink is deposited in an area of 100% of the image area, and the color ink is also deposited in an area of 15% of the image area. In the deposition of the color ink in the area of 15%, each of C, M and Y is deposited in an area of 5% in the examples 1 and 3, but, C alone is deposited in the area of 15% in the example 2.

(Bleeding and White Haze)

Figure 16:
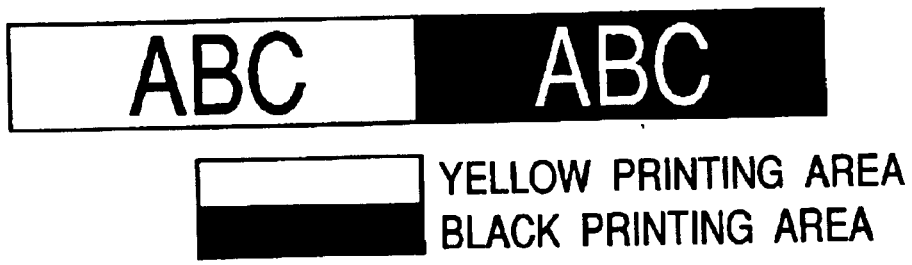
FIG. 16 is a view showing a print pattern to be used in the evaluation of bleeding and white haze.

There was printed a print pattern in which color and black image area are mutually adjacent as shown in FIG. 16, and the bleeding at the boundary portion and the white haze in the black area were evaluated in visual observation.

In this evaluation, the black image area was processed in "Bk: 100% duty, Col: 15% duty".

* Criteria of evaluation for bleeding

A: no bleeding at boundary portion
B: bleeding slightly noticeable at boundary portion
C: bleeding considerably noticeable at boundary portion.

* Criteria of evaluation for white haze

A: no white haze
B: white haze slightly noticeable
C: white haze considerably noticeable (Density Difference in Black Image Areas)

Figure 17:
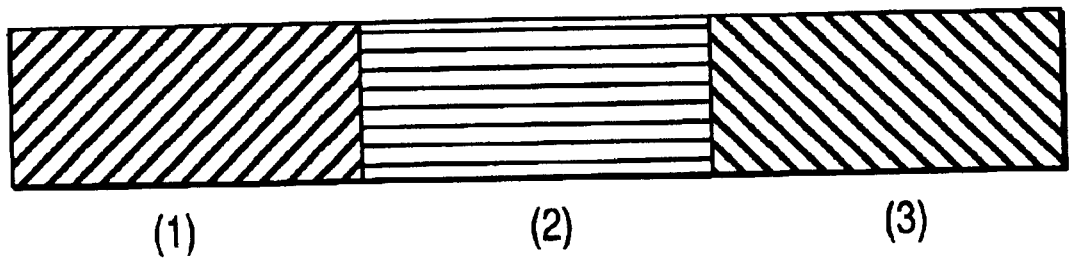
FIG. 17 is a view showing an image pattern to be used in the evaluation of density difference of a black image area in the image processing.

There was printed a print pattern in which three solid black image areas of (1) Bk: 100% duty, (2) Bk: 100% duty, Col: 5% duty, and (3) Bk: 100% duty, Col: 15% duty, are mutually adjacent as shown in FIG. 17, and the density difference between the images and the uniformity of image were evaluated by visual observation.

* Criteria of evaluation for density difference

A: solid black images have no noticeable boundary and give uniform impression
B: solid black images have no noticeable boundary but do not give uniform impression
C: solid black images have noticeable boundary.

TABLE 4

|  | Result of evaluation | | |
|---|---|---|---|
|  | Bleeding | White haze | Density difference |
| Example 1 | A | A | A |
| Example 2 | A | A | A |
| Example 3 | A | A | C |
| Ref. Ex. | C | B | B |

The foregoing results confirm that the image formation with the ink set of the present invention is not only capable of preventing the bleeding and the white haze, but also provides an image giving the impression of uniformity and showing no density difference between the black image formed solely with the black ink and the black image formed by superposing the black ink and the color ink.

(3) Preparation of Ink Set
(3-1) Preparation of Inks
Inks were prepared with the following compositions:
(Yellow Ink 3: Y3)

Acetylene glycol ethylene oxide addition product: 1.0 part (Acetylenol EH: supplied by Kawaken Fine Chemical Co.)
Ethylene urea: 6 parts
2-pyrrolidone: 6 parts
Ethanol: 5 parts
C.I. Direct yellow 132: 3 parts
Magnesium nitrate: 2 parts
Water: remainder (Magenta Ink 3: M3)

Acetylene glycol ethylene oxide addition product: 1.0 part (Acetylenol EH: supplied by Kawaken Fine Chemical Co.)
Ethylene urea: 6 parts
2-pyrrolidone: 6 parts
Ethanol: 5 parts
Example compound 7: 3 parts
Example compound 8: 1 part
C.I. Acid red 289: 0.1 parts
Magnesium nitrate: 3 parts
Water: remainder (Cyan Ink 3: C3)

Acetylene glycol ethylene oxide addition product: 1.0 part (Acetylenol EH: supplied by Kawaken Fine Chemical Co.)
Ethylene urea: 6 parts
2-pyrrolidone: 6 parts Ethanol: 5 parts
C.I. Direct blue 199: 3.5 parts
C.I. Acid blue 9: 0.3 parts
Magnesium nitrate: 3 parts
Water: remainder (Cyan Ink 3: C4)

Acetylene glycol ethylene oxide addition product: 1.0 part
(Acetylenol EH: supplied by Kawaken Fine Chemical Co.)
Ethylene urea: 6 parts
2-pyrrolidone: 6 parts
Ethanol: 5 parts
C.I. Direct blue 199: 1.5 parts
Magnesium nitrate: 3 parts
Water: remainder (Optical Absorbance)

C3 and C4 were subjected to the measurement of optical absorbance at the maximum absorption wavelength in the visible light range. As a result, C3 showed a maximum absorption wavelength of 621.5 nm with an optical absorbance of 1.10, while C4 shows a maximum absorption wavelength of 615.5 nm with an optical absorbance of 0.38, so that C3 and C4 had almost same colors. The ratio of optical absorbance of C3 and C4 was C4/C3≅0.347≧1/20.

(3-3) Retention Rate of Reflective Density (ΔE)

The inks Y3, M3, C3 and C4 were filled in a printer and used for respectively printing solid images of a reflective density of 1.0 on a glossy paper (PR-101; supplied by Canon Inc.), and the obtained print was subjected, after spontaneous drying for 24 hours, to a light fastness test under irradiation through a covering glass by a xenon fademeter Ci3000 (supplied by Atlas Co.) for 100 hours with an illumination intensity of 63 klux.

Other conditions of lamp, filter, temperature and humidity in the chamber were based on the conditions of the indoor solar light coming through the window, defined in the ISO 10977 (temperature 25° C., relative humidity 55% in the chamber). Though the ISO standard defines an illumination intensity of 6 klux, conditions of 63 klux and 100 hours were adopted since the test time becomes excessively long for a test of 6,000 klux·hr or higher, and the absence of reciprocity failure was confirmed at equal irradiation amounts. The reflective density and the color coordinates L*, a*, b* were measured in the solid portion of the print before and after the test, by a reflective densitometer X-Rite 938 (trade name: supplied by X-Rite Inc.), and the retention rate of reflective density and the color discoloration ΔE were calculated according to the foregoing equation (1). The obtained results are shown in Table 5.

TABLE 5

| | (OD retention rate; ΔE) | | | |
|---|---|---|---|---|
| | Y3 | M3 | C3 | C4 |
| OD retention rate | 96 | 91 | 92 | 92 |
| ΔE | 3 | 4 | 5 | 3 |

(3-4) Color Balance

The ink sets of the combinations shown in following Table 6 were prepared on a printer. Inks of each ink set were filled in the ink container portions of a printer of the configuration explained in (1) and were used in printing a full-color image on a glossy paper (PR-101: supplied by Canon Inc.).

TABLE 6

| | Bk | C | M | Y |
|---|---|---|---|---|
| Example 4 | Bk1 | C3 | M3 | Y3 |
| Example 5 | Bk2 | C3 | M3 | Y3 |

The print was subjected, after spontaneous drying for 24 hours, to a light fastness test similar to that explained above, and the color balance of the print after the test was evaluated by visual observation. As a result, the color balance was satisfactory in both combinations.

As explained in the foregoing, the present invention provides a recording unit and an image recording apparatus of a configuration in which, in case of using the color ink and the black ink in combination, the black image and character formed by the black ink in the presence of the color ink satisfy various properties such as a high optical density, high image quality and high image fastness and which also enables prevention of bleeding and white haze and saving of the ink consumption.

What is claimed is:

1. A recording unit comprising:
    a black ink containing portion for containing a black ink including a pigment dispersed in a liquid medium;
    a color ink containing portion for containing a plurality of kinds of color inks, at least one kind of the color inks including a polyvalent metal salt impairing a dispersion stability of the pigment;
    a black ink discharge portion of a discharge type in which a bubble formed in the black ink for discharging the black ink by applying thermal energy to the black ink does not communicate with ambience upon discharging the black ink from a discharge port, said black ink discharge portion being provided with said discharge port for discharging the black ink, a liquid flow path communicating with said discharge port to supply the black ink to said discharge port, and an electrothermal converting element provided at a bottom surface of said liquid flow path opposite to said discharge port to generate the thermal energy for discharging the black ink; and
    a color ink discharge portion of a discharge type in which a bubble formed in the color ink for discharging the color ink by applying thermal energy to the color ink communicates with ambience upon discharging the color ink from a discharge port, said color ink discharge portion being provided with said discharge port for discharging the color ink, a liquid flow path communicating with said discharge port to supply the color ink to said discharge port, and an electrothermal converting element provided at a bottom surface of said liquid flow path opposite to said discharge port to generate the thermal energy for discharging the color ink.

2. A recording unit according to claim 1, wherein an area of said discharge port for discharging the black ink is larger than an area of said discharge port for discharging the color ink containing the polyvalent metal salt.

3. A recording unit according to claim 1, wherein the black ink includes an anionic radical.

4. A recording unit according to claim 1, wherein the black ink further includes a salt.

5. A recording unit according to claim 1, wherein the polyvalent metal salt is at least a polyvalent metal salt including, as a polyvalent metal cation, $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$ or $Al^{3+}$.

6. A recording unit according to claim 1, wherein the content of the polyvalent metal salt is within a range of 0.1 to 15 mass % with respect to the total mass of the color ink including the polyvalent metal salt.

7. A recording unit according to claim 1, wherein the pigment of the black ink is carbon black, and the carbon black is provided, on the surface thereof, with a hydrophilic radical of at least a kind of ionic radical, which is bonded either directly or through another atomic group.

8. A recording unit according to claim 1, wherein the black ink includes carbon black as the pigment, and also a dispersant having an ionic radical.

9. A recording unit according to claim 1, wherein a coloring material of the color ink including the polyvalent metal salt is an acidic dye or a direct dye.

10. A recording unit according to claim 1, wherein said black ink containing portion and said black ink discharge portion are detachably connected.

11. A recording unit according to claim 1, wherein said color ink containing portion and said color ink discharge portion are detachably connected.

12. An image recording apparatus comprising:

a black ink containing portion for containing a black ink including a pigment dispersed in a liquid medium;

a color ink containing portion for containing a plurality of kinds of color inks, at least one kind of the color inks including a polyvalent metal salt impairing a dispersion stability of the pigment;

a black ink discharge portion of a discharge type in which a bubble formed in the black ink for discharging the black ink by applying thermal energy to the black ink does not communicate with ambience upon discharging the black ink from a discharge port, said black ink discharge portion being provided with said discharge port for discharging the black ink, a liquid flow path communicating with said discharge port to supply the black ink to said discharge port, and an electrothermal converting element provided at a bottom surface of said liquid flow path opposite to said discharge port to generate the thermal energy for discharging the black ink;

a color ink discharge portion of a discharge type in which a bubble formed in the color ink for discharging the color ink by applying thermal energy to the color ink communicates with ambience upon discharging the color ink from a discharge port, said color ink discharge portion being provided with said discharge port for discharging the color ink, a liquid flow path communicating with said discharge port to supply the color ink to said discharge port, and an electrothermal converting element provided at a bottom surface of said liquid flow path opposite to said discharge port to generate the thermal energy for discharging the color ink; and a mounting portion for mounting said black ink discharge portion and said color ink discharge portion.

13. An image recording method comprising the steps of:

arranging a black ink containing portion for containing a black ink including a pigment dispersed in a liquid medium, a color ink containing portion for containing a plurality of kinds of color inks, at least one kind of the color inks including a polyvalent metal salt impairing a dispersion stability of the pigment, a black ink discharge portion provided with a discharge port for discharging the black ink, a liquid flow path communicating with the discharge port to supply the black ink to the discharge port, an electrothermal converting element provided at a bottom surface of the liquid flow path opposite to the discharge port to generate thermal energy for discharging the black ink, and a color ink discharge portion provided with a discharge port for discharging the color ink, a liquid flow path communicating with the discharge port to supply the color ink to the discharge port, an electrothermal converting element provided at a bottom surface of the liquid flow path opposite to the discharge port to generate thermal energy for discharging the color ink;

discharging the black ink from the black ink discharge portion in a discharge mode in which a bubble formed in the black ink for discharging the black ink by applying the thermal energy to the black ink does not communicate with ambience upon discharging the black ink from the discharge port; and discharging the color ink from the color ink discharge portion in a discharge mode in which a bubble formed in the color ink for discharging the color ink by applying the thermal energy to the color ink communicates with ambience upon discharging the color ink from the discharge port.

* * * * *

UNITED STATES PATENT AND TRADEMARK OFFICE
CERTIFICATE OF CORRECTION

PATENT NO. : 6,749,290 B2
DATED : June 15, 2004
INVENTOR(S) : Takada et al.

It is certified that error appears in the above-identified patent and that said Letters Patent is hereby corrected as shown below:

Column 1,
Line 15, "in" should read -- for --.
Lines 21 and 56, "Also" should read -- Also, --.

Column 4,
Line 65, "following" should read -- following, --.

Column 5,
Line 13, "following" should read -- following, --.

Column 7,
Line 31, "Also" should read -- Also, --.

Column 8,
Line 36, "benzotate" should read -- benzoate --.
Line 53, "However" should read -- However, --.

Column 9,
Lines 20, 29 and 55, "Also" should read -- Also, --.

Column 10,
Line 6, "following" should read -- following, --.

Column 29,
Line 58, "components;" should read -- components, --.
Line 59, "contain;" should read -- contain, --.

Column 32,
Line 46, "means" (first occurrence) should read -- mean --.

UNITED STATES PATENT AND TRADEMARK OFFICE
CERTIFICATE OF CORRECTION

PATENT NO.   : 6,749,290 B2
DATED        : June 15, 2004
INVENTOR(S)  : Takada et al.

It is certified that error appears in the above-identified patent and that said Letters Patent is hereby corrected as shown below:

Column 35,
Line 53, "colors;" should read -- colors, -- and "provide" should read -- provided --.

Signed and Sealed this

Twelfth Day of April, 2005

JON W. DUDAS
*Director of the United States Patent and Trademark Office*